United States Patent
Sun et al.

(10) Patent No.: US 12,063,087 B2
(45) Date of Patent: Aug. 13, 2024

(54) METHOD AND DEVICE FOR RIS AUTOMATIC SETUP

(71) Applicant: Samsung Electronics Co., Ltd., Suwon-si (KR)

(72) Inventors: Weiping Sun, Suwon-si (KR); Ilju Na, Suwon-si (KR); Joohyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 17/969,414

(22) Filed: Oct. 19, 2022

(65) Prior Publication Data

US 2023/0129288 A1    Apr. 27, 2023

(30) Foreign Application Priority Data

Oct. 21, 2021    (KR) .................. 10-2021-0141405

(51) Int. Cl.
H04B 7/06    (2006.01)

(52) U.S. Cl.
CPC ......... H04B 7/0617 (2013.01); H04B 7/0695 (2013.01)

(58) Field of Classification Search
CPC .. H04B 7/061; H04B 7/0695; H04B 7/04013; H04B 7/04026; H04B 7/0413; H04B 17/318; H04L 25/0202; G06N 3/02
See application file for complete search history.

(56) References Cited

U.S. PATENT DOCUMENTS

| 2020/0212991 A1 | 7/2020 | Cho et al. |
| 2021/0013619 A1 | 1/2021 | Alkhateeb et al. |

(Continued)

FOREIGN PATENT DOCUMENTS

| CN | 111050276 A | 4/2020 |
| CN | 111246491 A | 6/2020 |

(Continued)

OTHER PUBLICATIONS

Terahertz Multi-User Massive, MIMO with Intelligent Reflecting Surface: Beam Training and Hybrid Beamforming, Jan. 14, 2021.

(Continued)

*Primary Examiner* — David S Huang
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting higher data transmission rates than 4th generation (4G) communication systems, such as long-term evolution (LTE) systems. A method and a device are provided. The method includes, by a user equipment (UE) in a wireless communication system, receiving RIS information from an RIS controller (RC), identifying an incident beam incident on the UE, providing information about the identified incident beam to the RC and requesting information about candidate RIS modes, receiving the information about the candidate RIS modes, performing probing on the candidate RIS modes, deriving a final RIS mode among the candidate RIS modes using a result of the probing, and transmitting information about the final RIS mode to an RIS through the RC.

20 Claims, 28 Drawing Sheets

(56) References Cited

U.S. PATENT DOCUMENTS

| | | | |
|---|---|---|---|
| 2021/0126359 A1 | 4/2021 | Kim et al. | |
| 2023/0048721 A1* | 2/2023 | Gurelli | H04B 17/382 |
| 2023/0246674 A1* | 8/2023 | Åström | H04B 7/04013 |
| | | | 375/262 |

FOREIGN PATENT DOCUMENTS

| | | |
|---|---|---|
| CN | 111818533 A | 10/2020 |
| KR | 10-2020-0068937 A | 6/2020 |
| KR | 10-2020-0080849 A | 7/2020 |
| KR | 10-2192234 B1 | 12/2020 |
| KR | 10-2021-0027983 A | 3/2021 |
| WO | 2020/116947 A1 | 6/2020 |

OTHER PUBLICATIONS

Chandradeep Singh et al., Fast Beam Training for RIS Assisted Uplink Communication, Jul. 23, 2021.
Chenglu Jia et al., Machine Learning Empowered Beam Management for Intelligent Reflecting Surface Assisted MnWave Networks, Mar. 3, 2020.
Qasim Sultan et al., Fast Beam Training Technique for Millimeter-Wave Cellular Systems with an Intelligent Reflective Surface, Jul. 20, 2021.
International Search Report dated Jan. 26, 2023, issued in International Patent Application No. PCT/ KR2022/015816.

* cited by examiner

| Incident beam ID \ Candidate ID | 1 | 2 | ... | $c$ (max($c_1, c_2, ..., c_q$)) |
|---|---|---|---|---|
| 1 | Mode 1.1 | Mode 1.2 | ... | Mode 1.c |
| 2 | Mode 1.2 | Mode 2.2 | ... | N.A. |
| ... | ... | ... | ... | ... |
| q | Mode q.1 | Mode q.2 | ... | Mode q.c |

FIG. 9C

METHOD AND DEVICE FOR RIS AUTOMATIC SETUP

CROSS-REFERENCE TO RELATED APPLICATION(S)

This application is based on and claims priority under 35 U.S.C. § 119(a) of a Korean patent application number 10-2021-0141405, filed on Oct. 21, 2021, in the Korean Intellectual Property Office, the disclosure of which is incorporated by reference herein in its entirety.

BACKGROUND

1. Field

The disclosure relates to a method and device for operating beams of a base station in a wireless communication system. More particularly, the disclosure relates to a method and device for performing efficient communication between a base station and a user equipment (UE) using reconfigurable intelligent surface (RIS) in a wireless communication system.

2. Description of Related Art

Considering the development of wireless communication from generation to generation, the technologies have been developed mainly for services targeting humans, such as voice calls, multimedia services, and data services. Following the commercialization of $5^{th}$-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the $6^{th}$-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in millimeter wave (mmWave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies, such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. More particularly, it is expected that services, such as truly immersive extended reality (XR), high-fidelity mobile hologram, and digital replica could be provided through 6G communication systems. In addition, services, such as remote surgery for security and reliability enhancement, industrial automation, and emergency response will be provided through the 6G communication system such that the technologies could be applied in various fields, such as industry, medical care, automobiles, and home appliances.

To meet the continuously increasing demand for wireless data traffic, the development of next-generation wireless communication technology using millimeter wave or terahertz wave has been actively conducted until recently. RF signals in this band are characterized by high straightness and low diffraction. Therefore, in the presence of an obstacle around, a communication shadow area easily occurs. Recently, reconfigurable intelligent surface (RIS) technology is emerging as a solution to the shadow area. RIS is an intelligent RF signal reflector that may be manufactured at a lower price than existing RF repeaters. RIS is characterized with the capability of changing the pattern (reflection direction or reflection beam width) of the reflected signal.

RIS may form a reflection pattern with a combination of the phase and/or amplitude of the reflecting elements (REs) included in RIS and reflect the beam incident on RIS in a desired direction according to the reflection pattern.

A need exists for a scheme for selecting a proper beam and reflection pattern among a plurality of beams and a plurality of reflection patterns to address the shadow area in an environment where a plurality of beams of a base station are supported and a plurality of reflection patterns are supported by RIS.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for performing efficient communication between a base station and a user equipment (UE) using RIS in a wireless communication system.

Another aspect of the disclosure is to provide a standalone reconfiguration intelligent surface (RIS) (operated by initial setting values without interworking with the base station) initial setting method and device.

Another aspect of the disclosure is to provide an RIS setting method and device including a preparation step by an RIS manufacturer and a setting step by an RIS installer.

Additional aspects will be set forth in part in the description which follows and, in part, will be apparent from the description, or may be learned by practice of the presented embodiments.

In accordance with an aspect of the disclosure, a method by a UE in a wireless communication system is provided. The method includes receiving, from an RIS controller (RC), information about candidate RIS modes selected per incident beam and control information for controlling reflection beam patterns of a RIS, identifying an incident beam pattern of the RIS, searching for a candidate RIS mode corresponding to the identified incident beam pattern, performing probing in the candidate RIS modes to select an optimal (final) RIS mode, and transmitting the optimal RIS mode to the RC.

According to various embodiments of the disclosure, there may be proposed a method by a UE in a wireless communication system comprising receiving RIS information from an RIS controller (RC), identifying an incident beam incident on the UE, providing information about the identified incident beam to the RC and requesting information about a candidate RIS mode, receiving the information about the candidate RIS mode, performing probing on the candidate RIS mode, deriving an optimal RIS mode among candidate RIS modes using a result of the probing, and transmitting information about the optimal RIS mode to an RIS through the RC.

According to various embodiments of the disclosure, there may be proposed the method, wherein the RIS information is information including an identifier (ID) of the RIS, and the information about the candidate RIS mode includes a list of candidate RIS modes classified per incident beam.

According to various embodiments of the disclosure, there may be proposed the method, further comprising, performing probing from a candidate RIS mode having a largest beam width of reflection beam among the candidate RIS modes, selecting a candidate RIS mode having a largest reception signal strength among the first probed candidate RIS modes, and performing probing on a candidate RIS mode similar in direction of reflection beam to the selected candidate RIS mode and narrower in beam width of reflection beam than the selected candidate RIS mode.

According to various embodiments of the disclosure, there may be proposed the method, wherein the candidate RIS modes are arranged in a tree-shaped hierarchical structure based on beam width and beam direction and are probed in order from a higher layer.

According to various embodiments of the disclosure, there may be proposed the method, wherein the RIS information includes information about a machine learning (ML) model using an RIS mode with a largest reception signal strength among the candidate RIS modes as a result value, and wherein the optimal RIS mode is derived as a result value obtained by inputting a candidate RIS mode corresponding to an incident beam identified by the UE to the ML model.

According to various embodiments of the disclosure, there may be proposed the method, wherein the ML model used to derive the optimal RIS mode is trained per incident beam pattern.

According to various embodiments of the disclosure, there may be proposed the method, further comprising, capturing the RIS, estimating a relative position between the UE and the RIS based on the captured RIS, recognizing the estimated position as a shadow area of the UE, and deriving a candidate RIS mode corresponding to the shadow area among the candidate RIS modes, as the optimal RIS mode.

According to various embodiments of the disclosure, there may be proposed the method, wherein the optimal RIS mode is derived based on the relative position between the UE and the RIS and the incident beam pattern.

In accordance with another aspect of the disclosure, a method by a RIS in a wireless communication system is provided. The method includes receiving a request for channel estimation from an RIS controller (RC), identifying incident beams incident from a base station to the RIS, transmitting channel information about an incident beam having a largest reception strength among the incident beams to the RC, receiving information about an optimal RIS mode derived by a UE through the RC, and setting the RIS as the optimal RIS mode.

According to various embodiments of the disclosure, there may be proposed the method, wherein the RIS is a device reflecting a signal transmitted from a base station or a UE to be received by the UE or the base station, wherein the RIS determines an amplitude and phase of a signal reflected in at least one or more RIS unit cells, wherein the RIS mode is a combination of respective states of the RIS unit cells, wherein the RIS mode is set by a manufacturer in advance, and wherein information about the RIS mode is stored in the RC.

In accordance with another aspect of the disclosure, a UE in a wireless communication system is provided. The UE includes a transceiver and at least one processor configured to receive RIS information from an RIS controller (RC) through the transceiver, identify an incident beam incident on the UE, provide information about the identified incident beam to the RC through the transceiver and request information about a candidate RIS mode, receive the information about the candidate RIS mode through the transceiver, perform probing on the candidate RIS mode, derive an optimal RIS mode among candidate RIS modes using a result of the probing, and transmit, through the transceiver, information about the optimal RIS mode to an RIS through the RC.

According to various embodiments of the disclosure, there may be proposed the UE, wherein the RIS information is information including an identifier (ID) of the RIS, and the information about the candidate RIS mode includes a list of candidate RIS modes classified per incident beam.

According to various embodiments of the disclosure, there may be proposed the UE configured to perform probing from a candidate RIS mode having a largest beam width of reflection beam among the candidate RIS modes, select a candidate RIS mode having a largest reception signal strength among the first probed candidate RIS modes, and performing probing on a candidate RIS mode similar in direction of reflection beam to the selected candidate RIS mode and narrower in beam width of reflection beam than the selected candidate RIS mode.

According to various embodiments of the disclosure, there may be proposed the UE, wherein the candidate RIS modes are arranged in a tree-shaped hierarchical structure based on beam width and beam direction and are probed in order from a higher layer.

According to various embodiments of the disclosure, there may be proposed the UE, wherein the RIS information includes information about an ML model using an RIS mode with a largest reception signal strength among the candidate RIS modes as a result value, and wherein the optimal RIS mode is derived as a result value obtained by inputting a candidate RIS mode corresponding to an incident beam identified by the UE to the ML model.

According to various embodiments of the disclosure, there may be proposed the UE, wherein the ML model used to derive the optimal RIS mode is trained per incident beam pattern.

According to various embodiments of the disclosure, there may be proposed the UE configured to capture the RIS, estimate a relative position between the UE and the RIS based on the captured RIS, recognize the estimated position as a shadow area of the UE, and derive a candidate RIS mode corresponding to the shadow area among the candidate RIS modes, as the optimal RIS mode.

According to various embodiments of the disclosure, there may be proposed the UE, wherein the at least one processor is configured to derive the optimal RIS mode based on the relative position between the UE and the RIS and the incident beam pattern.

In accordance with another aspect of the disclosure, a RIS in a wireless communication system is provided. The RIS includes a transceiver and at least one processor configured to receive a request for channel estimation from an RIS controller (RC) through the transceiver, identify incident beams incident from a base station to the RIS, transmit, through the transceiver, channel information about an incident beam having a largest reception strength among the incident beams to the RC, receive, through the transceiver, information about an optimal RIS mode derived by a UE through the RC, and set the RIS as the optimal RIS mode.

According to various embodiments of the disclosure, there may be proposed the RIS, wherein the RIS is a device reflecting a signal transmitted from a base station or a UE to be received by the UE or the base station, wherein the RIS determines an amplitude and phase of a signal reflected in at least one or more RIS unit cells, wherein the RIS mode is a combination of respective states of the RIS unit cells, wherein the RIS mode is set by a manufacturer in advance, and wherein information about the RIS mode is stored in the RC.

According to various embodiments of the disclosure, the base station may efficiently communicate with the UEs using RIS.

According to various embodiments of the disclosure, the base station may efficiently communicate with the UE located in a shadow area through the optimal beam and the optimal reflection pattern.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9C is a view illustrating beam book according to selection of a candidate RIS mode per incident beam according to an embodiment of the disclosure;

Throughout the drawings, like reference numerals will be understood to refer to like parts, components, and structures.

DETAILED DESCRIPTION

Figure 1:
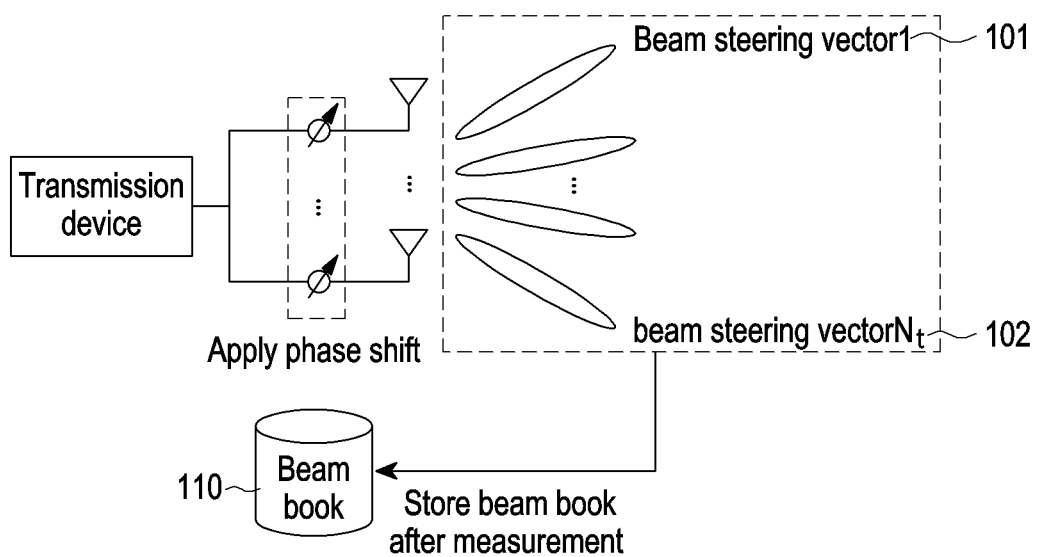
FIG. 1 is a view illustrating a beam book generation process previously performed according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card.

According to embodiments of the disclosure, the base station may be an entity allocating resource to terminal and may be at least one of next generation node B (gNode B, gNB), evolved node B (eNode B, eNB), Node B, base station (BS), wireless access unit, base station controller, or node over network. The base station may be a network entity including at least one of an integrated access and backhaul-donor (IAB-donor), which is a gNB providing network access to UE(s) through a network of backhaul and access links in the NR system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

Further, the UE may include a user equipment (UE), a mobile station (MS), a cellular phone, a smart phone, a computer, or various devices capable of performing a communication function. In the disclosure, downlink (DL) refers to a wireless transmission path of signal transmitted from the base station to the terminal, and uplink (UL) refers to a wireless transmission path of signal transmitted from the terminal to the base station. Although the long-term evolution (LTE) or long term evolution advanced (LTE-A) systems may be described below as an example, embodiments of the disclosure may be applied to other communication systems having a similar technical background or channel shape. For example, 5G mobile communication technology (5G, new radio (NR)) developed after LTE-A may be included therein, and 5G below may be a concept including legacy LTE, LTE-A and other similar services. Further, the embodiments may be modified in such a range as not to significantly depart from the scope of the disclosure under the determination by one of ordinary skill in the art and such modifications may be applicable to other communication systems.

As used herein, terms denoting signals, terms denoting channels, terms denoting control information, terms denoting network entities, and terms denoting device components are provided as an example for ease of description. As used herein, terms for identifying nodes, terms denoting messages, terms denoting inter-network entity interfaces, and terms denoting various pieces of identification information are provided as an example for ease of description. The disclosure is not limited to the terms, and other terms equivalent in technical concept may also be used.

Although the disclosure describes various embodiments using terms used in some communication standards (e.g., 3rd generation partnership project (3GPP)), this is merely an example for description. Various embodiments of the disclosure may be easily modified and applied in other communication systems.

FIG. 1 is a view illustrating a beam book generation process previously performed according to an embodiment of the disclosure.

Figure 2:
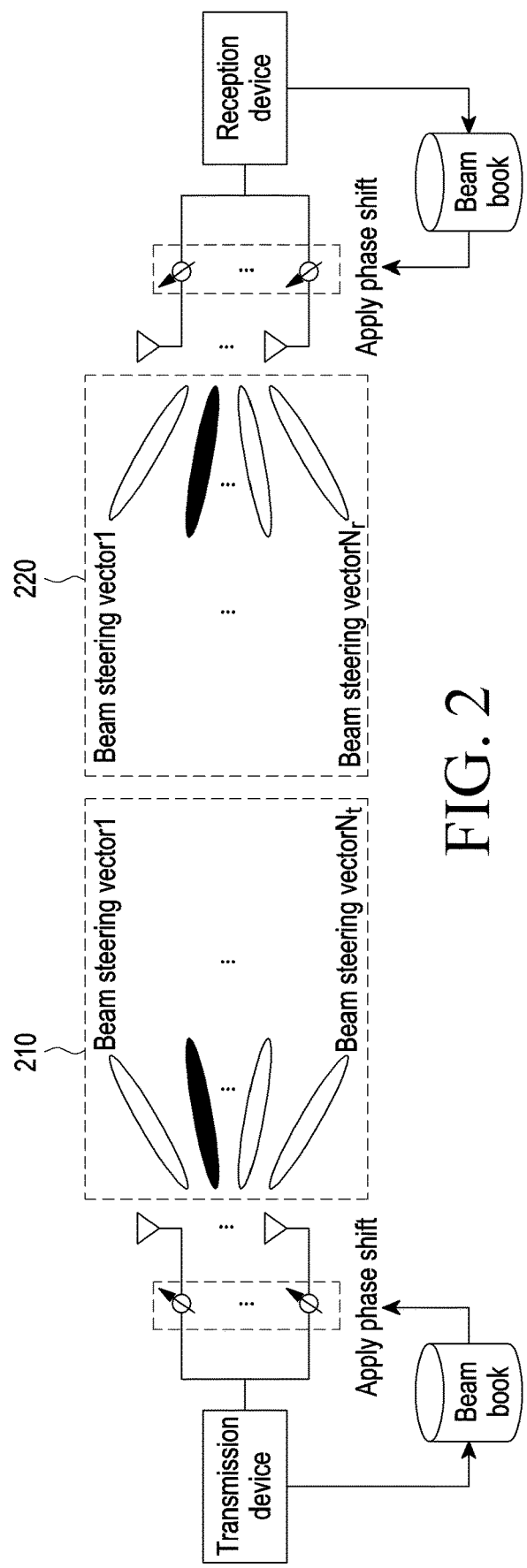
FIG. 2 is a view illustrating performing a beam search using beam book information to find an optimal transmission/reception beam by a transmission/reception device according to an embodiment of the disclosure.

FIG. 2 is a view illustrating performing a beam search using beam book information to find an optimal transmission/reception beam by a transmission/reception device according to an embodiment of the disclosure.

Referring to FIGS. 1 and 2, it illustrates generating a beam book, which may be performed in advance by the manufacturer. After probing all possible beam steering vectors from beam steering vector 1 101 to beam steering vector Nt 102 in advance, the manufacturer may identify the probed beam steering vectors and the measured reflection direction and store them in a beam book 110.

FIG. 2 illustrates a transmission device and reception device perform a beam search using beam book information to find the optimal transmission beam and reception beam, respectively. A transmission side 210 and a reception side 220 each may apply the beam steering vector stored in the beam book and transmit/receive signals as transmission/reception beams in various directions and then derive the optimal transmission/reception beam with respect to the measured reception signal strength. As an example, the beam steering vector with the largest reception signal strength as measured when the transmission side 210 transmits a signal from beam steering vector 1 to beam steering vector Nt, and the reception side 220 receives a signal from beam steering vector 1 to beam steering vector Nt may be selected to perform beam establishment.

Figure 3:
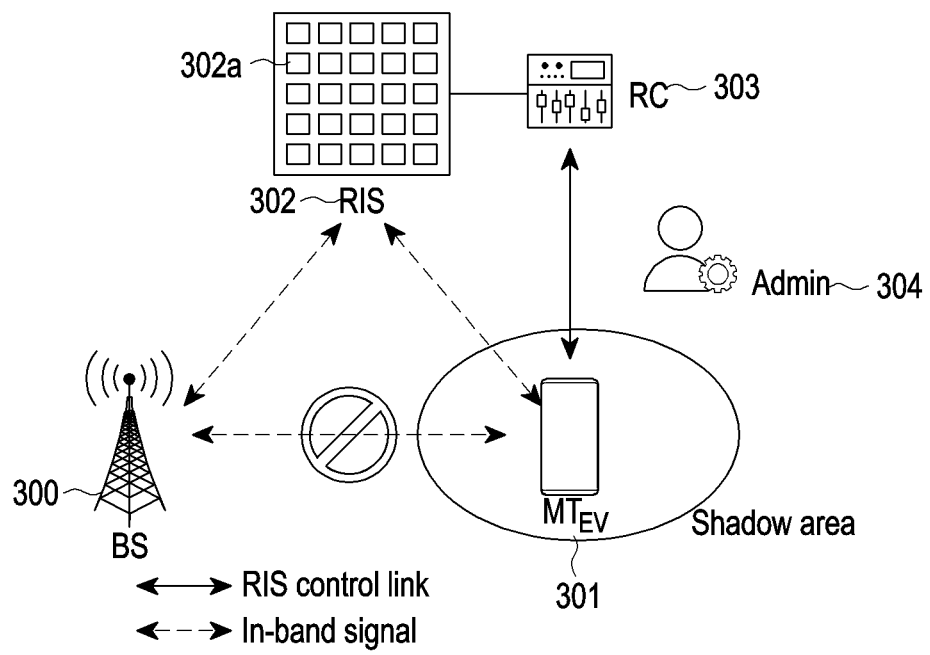
FIG. 3 is a view schematically illustrating a deployment structure of a wireless communication system including reconfiguration intelligent surface (RIS) according to an embodiment of the disclosure.

FIG. 3 is a view schematically illustrating a structure of a wireless communication system including RIS according to an embodiment of the disclosure.

Figure 4:
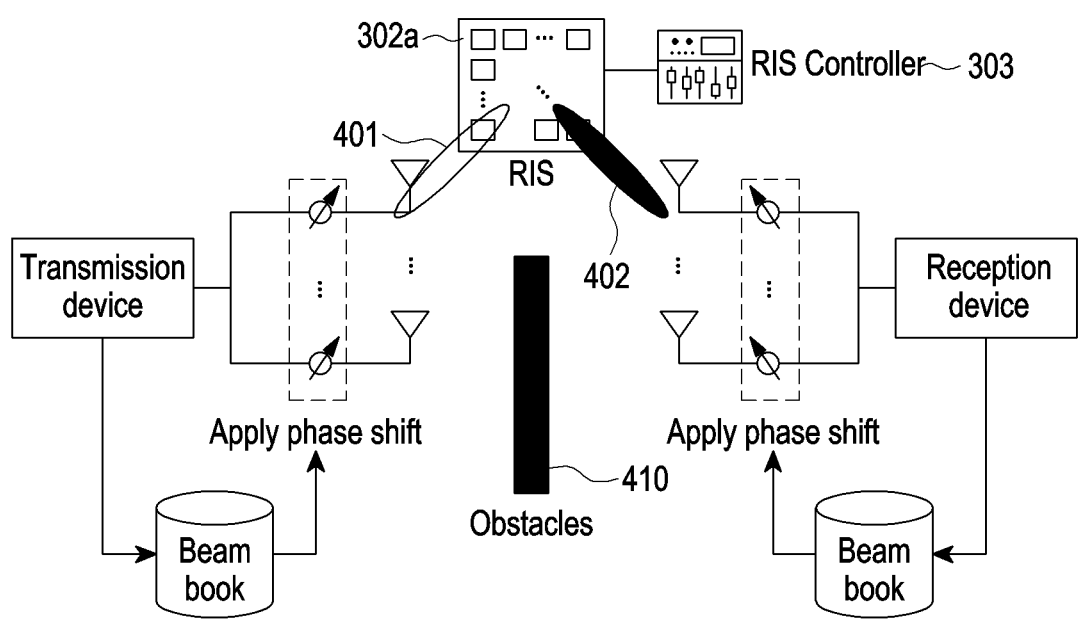
FIG. 4 is a view illustrating a device for reflecting a transmission signal to be received by a reception device when direct communication by transmission/reception devices is difficult according to an embodiment of the disclosure.

FIG. 4 is a view illustrating a device for reflecting a transmission signal to be received by a reception device when direct communication by transmission/reception devices is difficult according to an embodiment of the disclosure.

FIG. 3 is a view schematically illustrating a deployment structure of a wireless communication system including a reconfigurable intelligent surface (RIS) according to an embodiment of the disclosure. The wireless communication system may include a base station 300, a mobile terminal (MTev) 301, an RIS 302, an RIS controller (RC) 303, and an Admin 304.

Referring to FIG. 3, the base station (BS) 300 may denote any commercial device (e.g., mobile communication base station or wireless fidelity (Wi-Fi) wireless router) that provides wireless Internet services. The mobile terminal (MT) may denote a use mobile terminal (e.g., a smartphone or tablet PC) that receives the wireless Internet service provided by the base station. The evaluating mobile terminal ($MT_{EV}$) 301 may denote a mobile terminal that performs information exchange with the RC and several measurements accompanied by the RIS initial setup process proposed in the disclosure. The mobile terminal (e.g., a commercial smartphone) in actual use may have an RIS setup application (APP) installed to be used as $MT_{EV}$. The RIS 302 may denote a device that reflects the signal transmitted from the base station/mobile terminal to be received by the mobile terminal/base station. The RIS unit cell 302a may denote a basic unit that reflects RF signals in the RIS 302. Usually, the RIS unit cell 302a may be implemented as a patch antenna. When a signal is reflected by the RIS unit cell, a change in the amplitude/phase of the reflected signal relative to the incident signal may be determined by the state of the corresponding unit cell. The unit cell may operate in one or more states. The RIS may be typically constituted of several hundreds of or more RIS unit cells.

The RC 303 may be a device that sets the RIS 302 to operate in a specific RIS mode. The RIS mode is a basic unit for RIS settings and may denote a specific combination (or pattern) of the states of RIS unit cells. The RIS mode that may be set by the RIS installer (Admin) may be determined by the RIS manufacturer in advance and be a set of all physically possible unit cell state combinations or a subset thereof. If wired or wireless out-of-band (OOB) connection with an external device is supported, the RC 303 may be in charge of exchange of information necessary for initial settings with the external device.

The RIS installer (Admin) 304 may denote an entity that has the authority to install and set the RIS and recognizes the setting method, such as an RIS install technician/user/ building manager.

According to various embodiments of the disclosure, there is proposed a scheme for efficiently operating the base station beam and RIS pattern in an RIS-based wireless communication system. The RIS mode may be set by setting the phase value or reflection pattern of the RIS unit cell 302a which is the basic unit of the RIS 302. Referring to FIG. 3, the RIS 302 may be controlled by the RC 303.

According to various embodiments of the disclosure, the RC 303 needs to efficiently determine the RIS mode of the RIS 302 to support communication of the $MT_{EV}$ 301 located in the shadow area and the BS 300.

FIG. 4 is a view illustrating a device for reflecting a transmission signal to be received by a reception device when direct communication by transmission/reception devices is difficult for some reasons according to an embodiment of the disclosure.

Referring to FIG. 4, the RIS 302 is a device that reflects a transmission signal 401 to be received (402) by the reception device when direct communication between the transmission/reception devices is difficult, e.g., due to blockage by an ambient obstacle 410. The method of the related art for addressing shadow areas by using, e.g., repeaters/ relays receives a signal and then generates a retransmission signal amplified to have a higher level and suffers from expensive devices and interference with the ambient devices by the amplified signal. In contrast, it is possible to reflect signals to the shadow area by installing a metal reflector and, due to the physical properties (e.g., the law of specular reflection), this way requires manual angle adjustment upon installation and reinstallation or readjustment of the reflector if the location of the shadow area is changed. However, if the RIS is used, signals may be reflected in a desired direction at low costs without additional interference signals if the RIS setting is properly made, easily addressing the shadow area. The RIS setting aims to form the optimal reflection beam 402 to allow the reflected transmission signal to be properly transferred to the reception device. In other words, the RIS setting is for selecting the optimal beam to concentrate signal energy in a specific direction.

Analog beamforming of the related art was implemented in a way of applying specific phase shift values to a plurality of antennas, and a combination of phase shift values of several antennas was denoted as a beam steering vector. In this case, the correspondence between beam direction and beam steering vector was identified by the manufacturer in advance and stored in the beam book. The reason why beam book generation and beam book-based beam search were possible is that the entity performing beamforming and the entity (transmission/reception device) performing signal generation/reception are the same entity (transmission/reception device) so that the manufacturer could identify the beam steering effect of each beam steering vector by probing in advance and the beam steering vector corresponding to a specific direction to be included in the beam book could be selected using the result of probing.

The object of the RIS setting is to find an RIS mode in which the optimal (or final) reception beam may be generated and to set in the RIS mode. If the manufacturer is able to select the RIS mode corresponding to each reflection direction in advance, the beam book generation of the related art and stored beam book-based optical beam search method may be used. However, since the reflection beam pattern (e.g., direction or beam width) of the RIS is determined by a combination of 1) the incident beam pattern and 2) RIS mode, it is difficult to know the reflection beam pattern of a specific RIS mode without considering the incident beam pattern. Further, since the incident beam pattern is information that may not be known until the RIS is installed, the manufacturer has difficulty in determining the correspondence between reflection beam pattern and RIS mode. Accordingly, it is difficult to apply the beam book generation of the related art and beam book-based optimal beam search method to the RIS as it is, and a method for efficiently setting the RIS mode depending on the RIS installation context is required.

Referring to FIG. 4, it illustrates an RIS 302 set in a specific RIS mode to support the transmission device and the reception device located in the shadow area. The signal transmitted through a specific beam 401 among the Nt beams 210 on the transmission side is transmitted to the RIS 302 and is reflected (402) by the RIS 302 to the reception device, and the signals transmitted through the remaining transmission beams are not directed to the RIS 302 and are thus not reflected by the RIS 302 or do not reach the reception device.

According to various embodiments of the disclosure, there is proposed a method for quickly setting an RIS mode to search for the optimal transmission/reception beam, e.g., when the $MT_{EV}$ 301 is located in the shadow area between the BS 300 and the RIS 302, when an object that may cause communication failure is present between the BS 300 and the $MT_{EV}$ 301, or when an RIS is installed in a new place.

Figure 5:
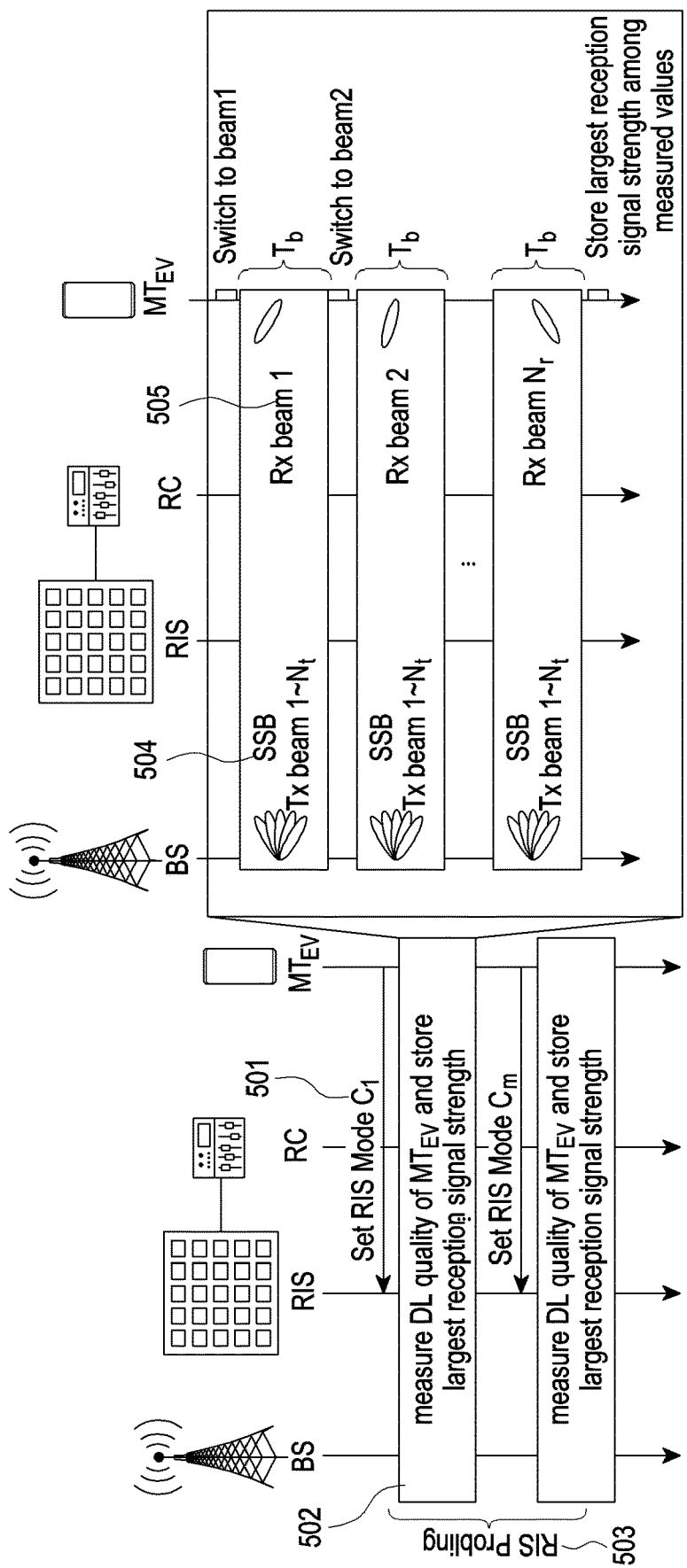
FIG. 5 is a view illustrating performing probing on each of m RIS modes according to an embodiment of the disclosure.

FIG. 5 is a view illustrating performing probing on each of m RIS modes according to an embodiment of the disclosure.

Referring to FIG. 5, it illustrates performing probing on each of m RIS modes C1 to Cm. As an example, the $MT_{EV}$ 301 may perform (503) RIS probing on m RIS modes by repeating, m times, a process 502 of measuring the quality of downlink (DL) of $MT_{EV}$ in a specific RIS mode C1 501 and storing the case where the reception signal strength is largest. Specifically, $MT_{EV}$ (or RIS) may transmit reception beam 1 (RX Beam 1) 505 through the downlink (DL) a synchronization signal block (SSB) 504 with the transmission beam (TX Beam 1 to Nt) of the base station (e.g., NR gNB) for specific RIS mode C1 501. The $MT_{EV}$ 301 may measure the reception signal strength while switching the transmission beam from TX Beam 1 to TX Beam Nt during a Tb time when the reception beam is fixed to RX Beam 1 505. The $MT_{EV}$ 301 may switch the reception beam to RX Beam 2 after a predetermined time and, likewise, measure the reception signal strength while switching the transmission beam from TX Beam 1 to TX Beam Nt during the Tb time. The $MT_{EV}$ 301 may measure the reception signal strength from RX Beam 1 505 to RX Beam Nr in this process and store the largest reception signal strength among the measured values. If measurement at RIS mode C1 ends, the $MT_{EV}$ 301 may repeat the above process from RIS mode C2 to RIS mode Cm.

After all, the probing method to find the optimal RIS mode may measure the link quality of the base station evolved NodeB (gNB) and UE ($MT_{EV}$) for each RIS mode C1 501 and then find the optimal RIS mode corresponding to the best link quality. However, it is not realistic for the $MT_{EV}$ 301 to perform probing (i.e., exhaustive search) on all settable RIS modes without selecting candidate RIS modes. Further, the number m of the settable RIS modes exponentially increases as the number of RIS unit cells 302*a* increases as shown in Table 1. Accordingly, the exhaustive search may cause an excessive setting delay or the RIS setting may never be finished. Table 2 is an example of delay in exhaustive search in NR. In Table 2, it is assumed that the number of states that the RIS unit cell 302*a* may have is 4, and the number of RIS modes is relatively small, so the actual exhaustive search delay may be much longer than that.

TABLE 1

Number of settable RIS modes

| number of RIS unit cells (Width) | number of RIS unit cells (Height) | Number of RIS modes$(4)^{W \times H}$ |
|---|---|---|
| 8 | 8 | 3.45810E+38 |
| 32 | 32 | ≈Inf |
| 80 | 40 | ≈Inf |

TABLE 2

RIS probing delay in Exhaustive Search

| Number of RIS modes | SSB period $T_b$ (sec) | Number of reception beams ($N_r$) | Exhaustive Search delay (sec) |
|---|---|---|---|
| 100 | 0.02 | 10 | 20 |
| 1,000 | 0.02 | 10 | 200 |
| 10,000 | 0.02 | 10 | 2,000 |
| 100 | 0.02 | 25 | 50 |
| 1,000 | 0.02 | 25 | 500 |
| 10,000 | 0.02 | 25 | 5,000 |

Therefore, it is required to shorten the RIS mode setting time. When the RIS reflects the transmission signal, the pattern of the reflection beam may be determined by a combination of 1) the incident beam pattern and 2) the RIS mode. Considering these characteristics of RIS, if the $MT_{EV}$ 301 may know the incident beam pattern in real-time when setting the RIS, it is possible to select the optimal RIS by probing only candidate RIS modes selected per incident beam by the manufacturer in advance using the incident beam pattern and to significantly reduce the RIS setting time as compared with the exhaustive search.

Figure 6:
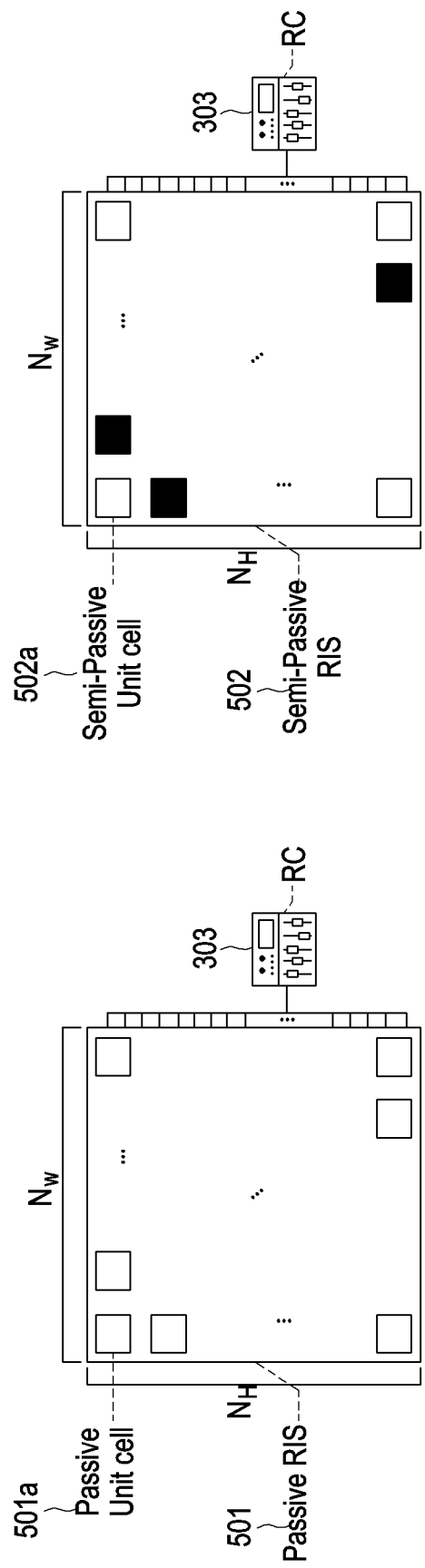
FIG. 6 is a view illustrating a passive RIS (left) and a semi-passive RIS (right) according to an embodiment of the disclosure.

FIG. 6 is a view illustrating a passive RIS and semi-passive RIS structure according to an embodiment of the disclosure.

Referring to FIG. 6, according to the characteristics of the RIS unit cells, RIS may be divided into two types. The semi-passive RIS 502 and the passive RIS mode C1 501 may be divided based on whether incident beam pattern analysis is performed by the RIS itself or by $MT_{EV}$ (in the RIS installed location). The passive RIS mode C1 501 may denote an RIS in which all the unit cells 501*a* of the RIS have only signal reflection function. The semi-passive RIS 502 may denote an RIS in which the semi-passive unit cell 502*a*, as some unit cell of the RIS, may analyze the signal reflection function and reception signal to estimate the radio channel Specifically, the semi-passive RIS unit cell 502*a* analyzing the incident beam pattern may obtain the identifier (ID) for a specific incident beam according to the incident beam classification scheme obtained from the RC 303, and the RIS itself may perform incident beam pattern analysis when setting the semi-passive RIS 502 and, when set as the passive RIS mode C1 501, the $MT_{EV}$ may perform incident beam pattern analysis in the RIS-installed location.

Figure 7:
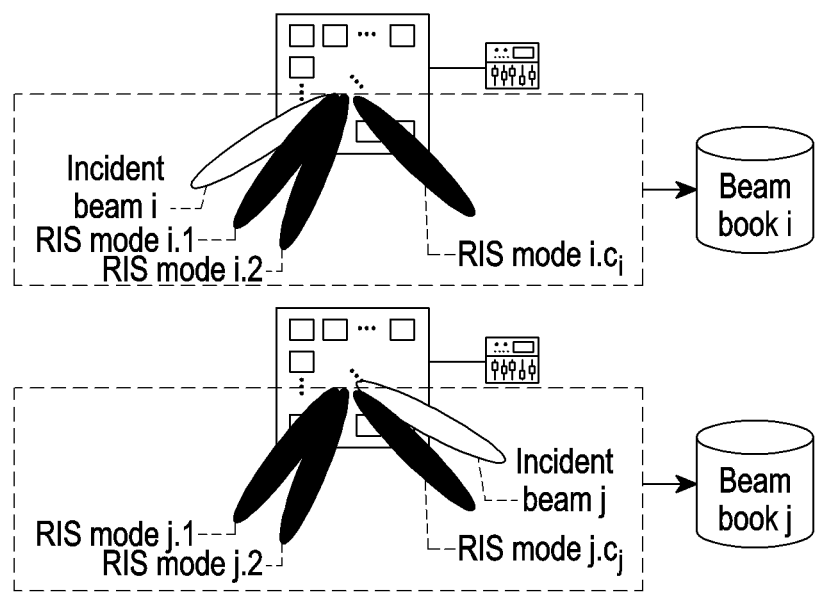
FIG. 7 is a view illustrating generating a candidate RIS mode beam book per incident beam according to an embodiment of the disclosure.

FIG. 7 is a view illustrating generating a beam book for candidate RIS modes per incident beam according to an embodiment of the disclosure.

Referring to FIG. 7, it may illustrate reflection beams according to Ci RIS modes (i.1 to i.Ci) applicable to incident beam i. Alternatively, reflection beams according to Ci RIS modes (j.1 to j.Ci) applicable to incident beam j having different incident angles may be shown. Information about the incident beam and candidate RIS modes may be recorded in the beam book per incident beam, and the beam book may be stored in the RC 303.

Figure 8:
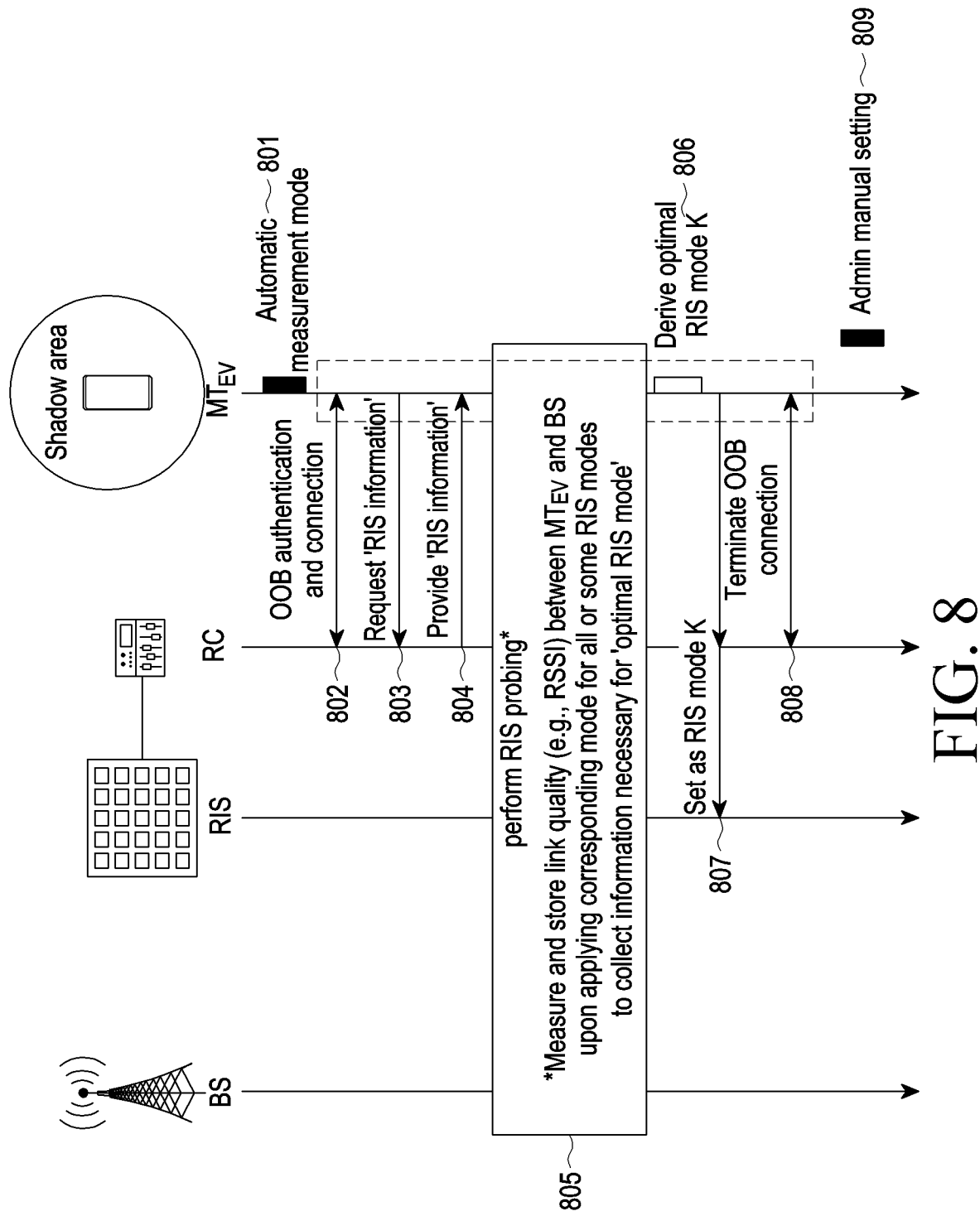
FIG. 8 is a view illustrating an RIS setting basic procedure according to an embodiment of the disclosure.

FIG. 8 is a view illustrating an RIS setting basic procedure according to an embodiment of the disclosure.

Referring to FIG. 8, embodiments of the disclosure for reducing a setting delay using incident beam pattern information upon RIS setting may be described with reference to FIG. 8. In the disclosure, an RIS setting procedure is basically as follows. Admin 304 may set operation 801 $MT_{EV}$ 301 to an automatic measurement mode. $MT_{EV}$ 301 may attempt OOB authentication and connection operation 802 (e.g., Wi-Fi/Bluetooth/Bluetooth low energy (BLE)/ Zigbee) to the RC 303. $MT_{EV}$ 301 may request operation 803 RIS information from the RC 303, and RC 303 may provide operation 804 RIS information to $MT_{EV}$ 301. For example, the RIS information may include at least one of the RIS identifier (ID), whether semi-passive RIS is set, a candidate RIS mode list, and information about an incident beam classification scheme when set as passive RIS. The RIS information is described below for each embodiment. $MT_{EV}$ 301 may perform RIS probing operation 805. Performing RIS probing operation 805 aims to collect information for deriving an optimal RIS mode, and be a process for measuring and storing the link quality (e.g., received signal strength indicator (RSSI)) between $MT_{EV}$ 301 and BS 300 when a corresponding RIS mode is applied. $MT_{EV}$ 301 may derive operation 806 the optimal RIS mode (RIS Mode K) by utilizing the RIS probing result. $MT_{EV}$ 301 may transfer information about the optimal RIS mode to the RC 303, and the RC 303 may allow the RIS 302 to be set operation 807 in the optimal RIS mode. $MT_{EV}$ 301 and RC 303 may terminate the OOB connection operation 808, and $MT_{EV}$ 301 may include the process of terminating operation 809 the automatic measurement mode.

The disclosure may further include four embodiments below to perform an RIS setting with low delay while performing the basic procedure on the RIS setting as described above.

1. How to Set RIS Using Incident Beam Pattern Information

According to an embodiment of the disclosure, a task for setting RIS by the manufacturer in advance may further be included. The manufacturer's pre-task may include 1) assigning an identifier (ID) to each incident beam and classifying incident beams considering the incident beam pattern (e.g., incident angle or beam width), 2) selecting per-incident beam candidate RIS modes and recording them in the beam book and storing the beam book in the RC 303, and 3) storing an incident beam classification scheme (e.g., incident beam ID=f(Angle of Arrival, (AoA))) in the RC 303.

Figure 9A:
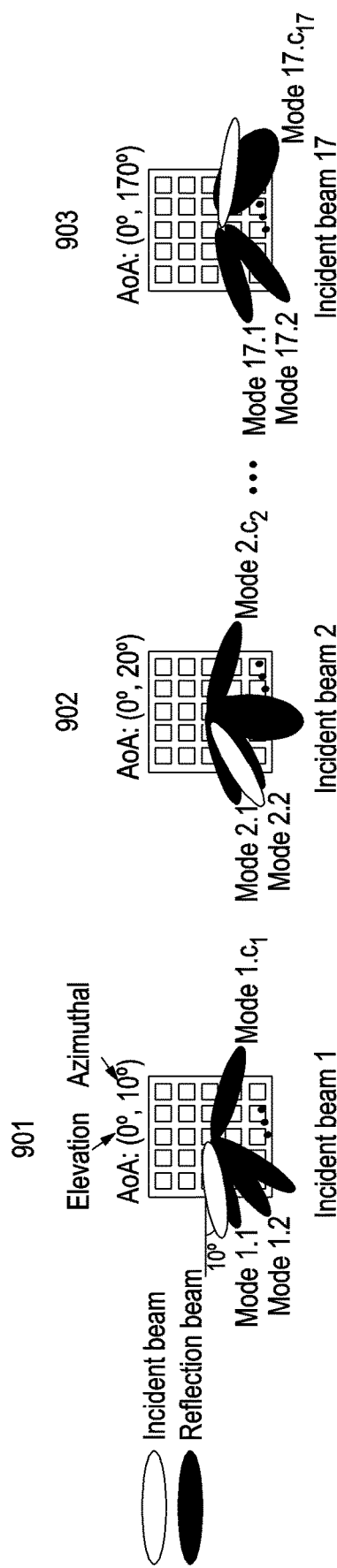
FIG. 9A is a view illustrating selecting a candidate RIS mode per incident beam and an incident beam classification according to an embodiment of the disclosure.

FIG. 9A is a view illustrating selecting candidate RIS modes per incident beam and an incident beam classification according to an embodiment of the disclosure.

Figure 9B:
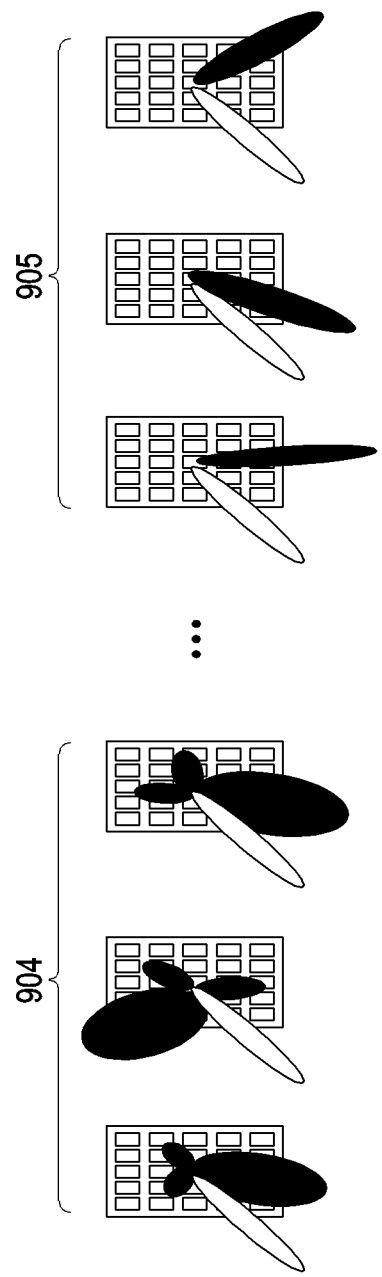
FIG. 9B is a view illustrating criterion of selecting a candidate RIS mode per incident beam according to an embodiment of the disclosure.

FIG. 9B is a view illustrating criterion of selecting a candidate RIS mode per incident beam according to an embodiment of the disclosure.

FIG. 9C is a view illustrating a beam book and selection of a candidate RIS mode per incident beam according to an embodiment of the disclosure.

Referring to FIGS. 9A, 9B, and 9C, they illustrate classifying incident beams based on incident directions (AoA (Elevation, Azimuthal)). For example, when the incident beam is AoA(0, 10), it is an incident beam incident at an elevation angle of 0 degrees and an azimuthal angle of 10 degrees, and for incident beam 1 901 having an azimuth angle of 10 degrees, the reflection beams according to Mode 1.1, Mode 1.2, . . . , Mode 1.C1 are shown. For example, if the incident beams are classified according to the azimuthal angles, IDs may be assigned to the incident beams, such as incident beam 1 901 when the azimuthal angle is 10 degrees, incident beam 2 902 when the azimuthal angle is 20 degrees, . . . , incident beam 17 903 when the azimuthal angle is 170 degrees. For each incident beam ID, there may be CID candidate RIS modes.

FIG. 9B illustrates selecting candidate RIS modes per reception direction when the incident direction of the incident beam is fixed. For example, the reflection beam may be classified as a wide beam 904 or a narrow beam 905. The wide beam 904 may address candidate shadow areas in a relatively small RIS mode so that upon RIS setting, the number of times of RIS probing may be reduced to decrease the setting delay. It is also able to support a certain level of user mobility. Accordingly, if the focus of consideration is on RIS setting delay or coverage, the reflection beam which is the wide beam 903 may be preferred. In contrast, the narrow beam 905 may concentrate energy in narrower directions and thus provide advantages in enhancing user signal-to-noise ratio (SNR). Accordingly, when SNR is intensively considered, the wide beam which is the narrow beam 905 may be favored. Considering advantages and disadvantages per beam width, the RIS mode meeting the manufacturer's requirements may be included in the candidate RIS modes.

Referring to FIG. 9C, upon selecting per-incident beam candidate RIS modes, the reflection beam width, as well as the direction of the reflection beam, may be considered. For example, there may be C candidate RIS modes as applicable to incident beam 1 whose ID is 1 and be stored in the beam book in Mode 1.1 to Mode 1.c. However, the number of candidate RIS modes applicable to incident beam 2 whose ID is 2 may differ from that of incident beam 1. Accordingly, the number of candidate RIS modes may differ per incident beam, and the number of columns (i.e., the number of candidate RIS modes) per incident beam in the beam book may differ. The beam book may be stored in the RC 303 to allow the candidate RIS modes to be referenced upon RIS setting.

Figure 10:
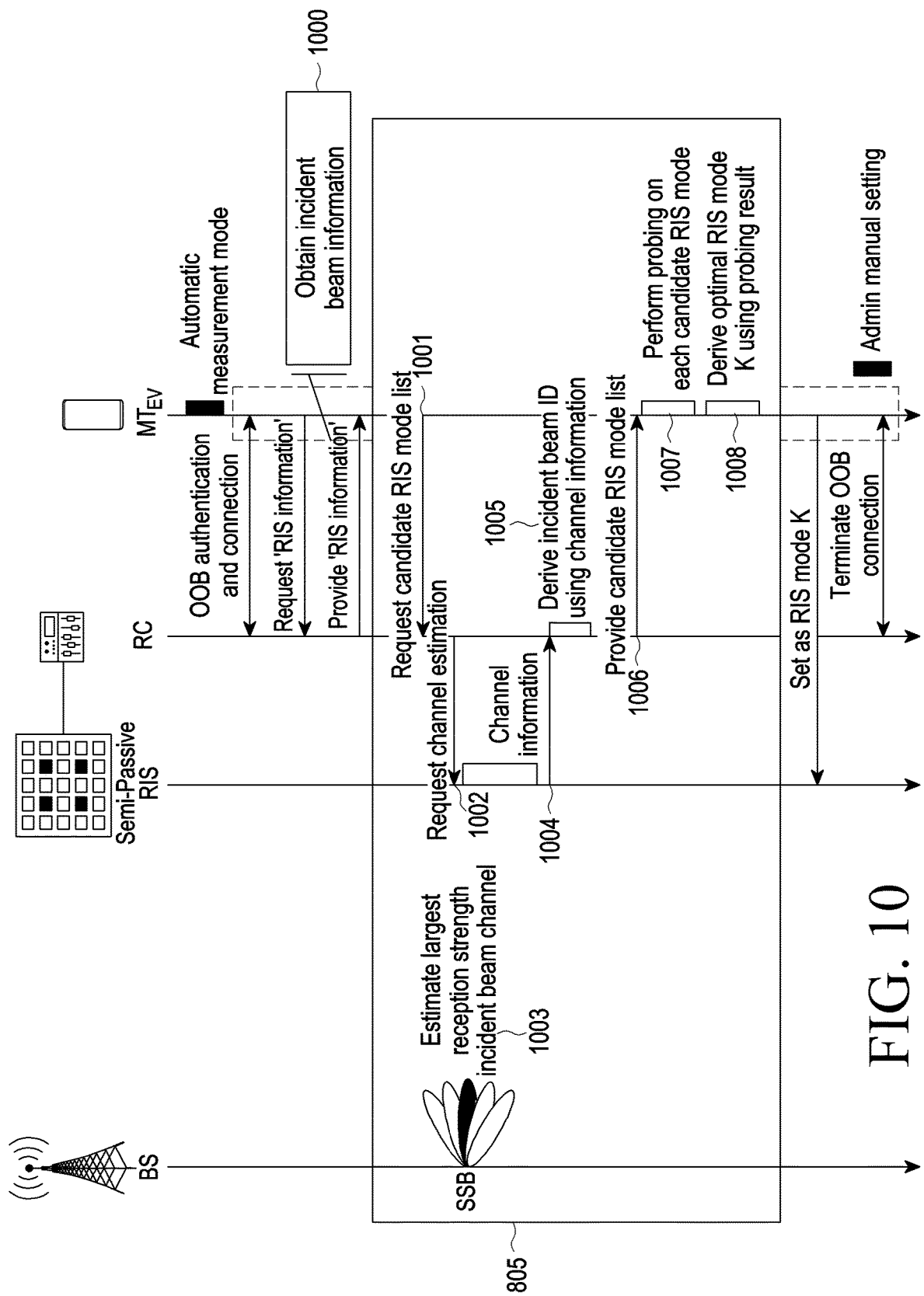
FIG. 10 is a view illustrating an embodiment in a case of a semi-passive RIS for an RIS setting according to an embodiment of the disclosure.

FIG. 10 is a view illustrating an embodiment in a case of a semi-passive RIS for an RIS setting according to an embodiment of the disclosure.

Figure 11:
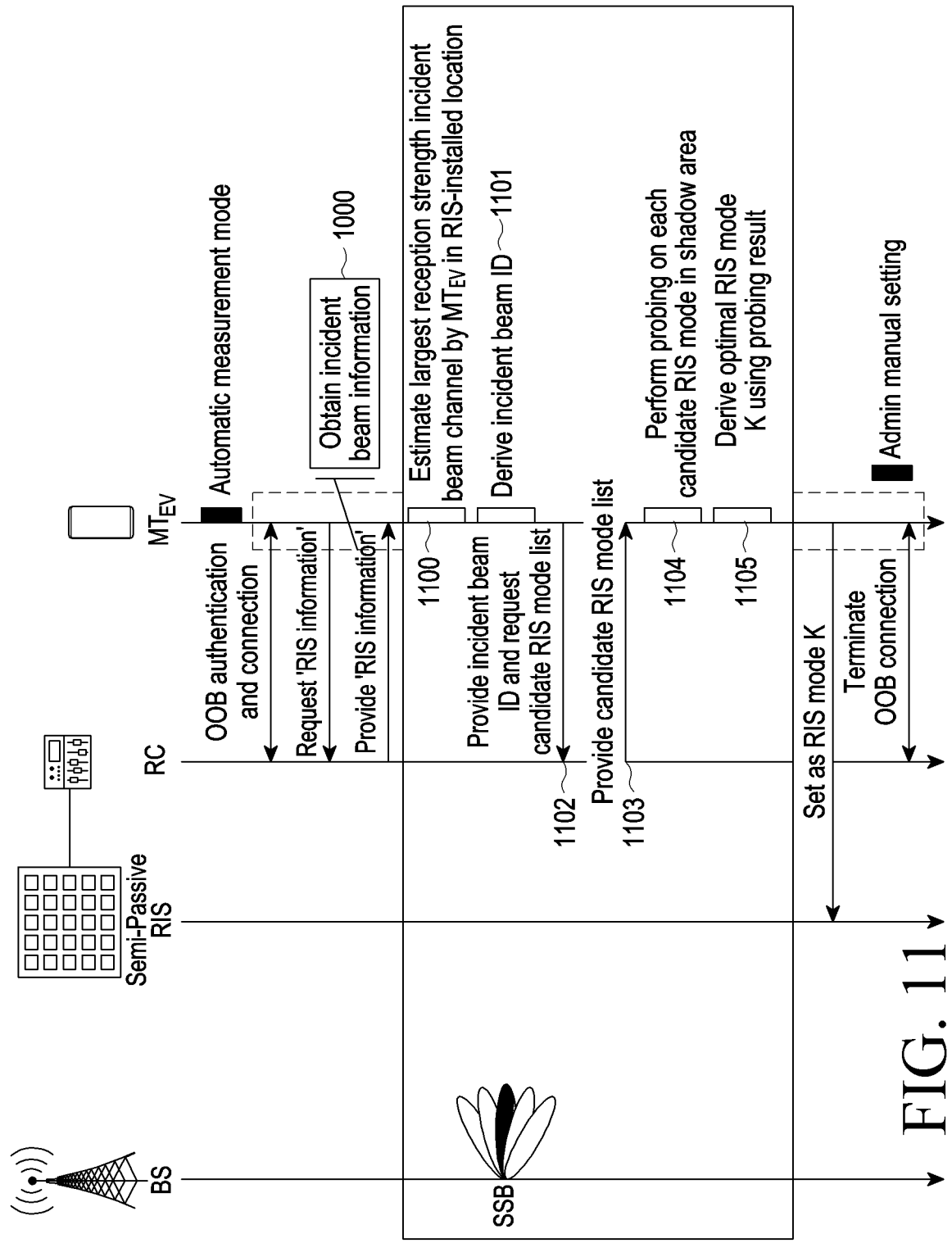
FIG. 11 is a view illustrating an embodiment in a case of a passive RIS for an RIS setting according to an embodiment of the disclosure.

FIG. 11 is a view illustrating an embodiment in a case of a passive RIS for an RIS setting according to an embodiment of the disclosure.

FIGS. 10 and 11 illustrate embodiments of the disclosure for the semi-passive RIS and passive RIS, respectively. The essential difference between the two examples lies in that incident beam pattern analysis is performed by the RIS itself or by $MT_{EV}$ 301. Probing is described below with reference to the description of FIG. 8.

Referring to FIG. 10, according to an embodiment of the disclosure, the $MT_{EV}$ 301 or RIS 302 may analyze the incident beam pattern and apply the incident beam classification scheme obtained from the RC 303 to obtain incident beam information operation 1000. When the RIS setting is the semi-passive RIS 502, the RIS 302 itself may perform incident beam pattern analysis and transfer RIS information (e.g., RIS ID and/or content regarding the RIS capability (information about whether it is semi-passive RIS)) to the $MT_{EV}$ 301 and, when the RIS setting is the passive RIS mode C1 501, it may further include incident beam information, which is information about the incident beam classification scheme, in the RIS information and transfer it to the $MT_{EV}$ 301, and the $MT_{EV}$ 301 may analyze the incident beam pattern in the RIS-installed location. At operation 1001, the $MT_{EV}$ 301 may request information about the candidate RIS mode corresponding to the incident beam ID (candidate RIS mode list) from the RC 303, and at operation 1002, the RC 303 may request the semi-passive RIS 502 for channel estimation. The semi-passive RIS 502 receiving the SSB 504 signal through the transmission beam from the BS 300 may estimate the channel of the incident beam having the largest reception strength operation 1003. The semi-passive RIS 502 may transmit the estimated channel information to the RC 303 operation 1004, and the RC 303 may derive operation 1005 the ID of the incident beam using the received channel information. The RC 303 may provide operation 1006 the information about candidate RIS modes (candidate RIS mode list) to the $MT_{EV}$, and the $MT_{EV}$ may obtain operation 1006 the candidate RIS mode corresponding to the incident beam ID from the RC, and the $MT_{EV}$ 301 may perform probing on each of the candidate RIS modes operation 1007. The $MT_{EV}$ 301 may derive the optimal RIS mode using the probing result operation 1008. To set as the optimal RIS mode (e.g., RIS Mode K), the $MT_{EV}$ 301 may transfer the derived optimal mode to the RC 303 and terminate the OOB connection with the RC 303.

Referring to FIG. 11, when set as the passive RIS mode C1 501, if the $MT_{EV}$ 301 obtains operation 1000 incident beam information, the $MT_{EV}$ 301 may estimate the channel for the incident beam with the largest reception strength among the incident beams incident on the $MT_{EV}$ 301 in the RIS-installed location operation 1100. The $MT_{EV}$ 301 may derive the ID for the incident beam based on previously given incident beam information (e.g., information regarding the beam characteristics, such as incident direction or beam width of the incident beam) operation 1101, provide the ID for the incident beam to the RC 303, and request candidate RIS mode information (candidate RIS mode list) operation 1102. The RC 303 may provide operation 1103 the candidate RIS mode information (candidate RIS mode list) to the $MT_{EV}$ 301, and the $MT_{EV}$ 301 receiving it performs operation 1104 probing on each candidate RIS mode in the shadow area. The $MT_{EV}$ 301 may derive the optimal RIS mode using the probing result operation 1105. Or, in addition to providing direct information (e.g., mode 1, mode 3, mode 7, . . . , mode m) about each mode as the candidate RIS mode information to the $MT_{EV}$ 301, the RC 303 may transfer a specific number k to the $MT_{EV}$ 301 to provide information indicating that there are a total of k candidate RIS modes. For example, in a case where a mapping relationship between the specific number k and the specific mode (e.g., 1(=mode 1), 2(=mode 3), 3(=mode 7), . . . , k(=mode m)) is stored in the RC 303, if the $MT_{EV}$ 301 transfers the specific number k, among 1, 2, . . . , k, to the RC 303, the RC 303 may set the RIS mode (mode m) corresponding to the number, and the $MT_{EV}$ 301 may perform probing on the RIS mode (mode m).

Figure 12:
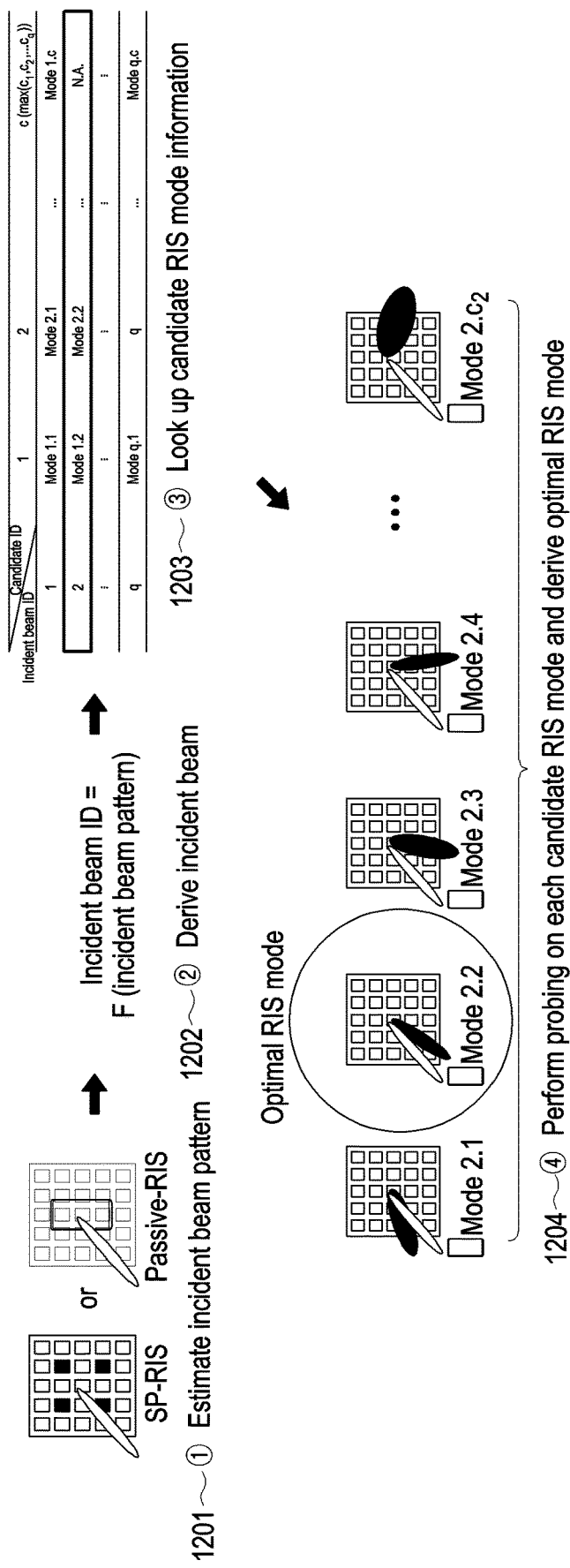
FIG. 12 is a view illustrating a procedure by a mobile terminal (MT) for an example of method 1 according to an embodiment of the disclosure.

FIG. 12 is a view illustrating a procedure by a $MT_{EV}$ for an embodiment of method 1 according to an embodiment of the disclosure.

Referring to FIG. 12, when set as the passive RIS mode C1 501, the $MT_{EV}$ 301 may estimate the incident beam pattern incident on the $MT_{EV}$ 301 and, when set as the semi-passive RIS 502, the RIS 302 itself may estimate the incident beam pattern incident on the RIS 302 at operation 1201. The $MT_{EV}$ 301 or semi-passive RIS 502 may derive at operation 1202 the ID (e.g., incident beam ID=2) for the incident beam using previously given incident beam information (e.g., information regarding the beam characteristics, e.g., incident direction and beam width of the incident beam). The $MT_{EV}$ 301 may perform the process of identifying the candidate RIS modes (e.g., candidate RIS modes (Modes 2.1, 2.2, . . . , 2.$c_2$) corresponding to incident beam ID=2) corresponding to the incident beam ID derived by looking up previously given candidate RIS mode information at operation 1203, performing probing on each of the identified candidate RIS modes, and deriving at operation 1204 the optimal RIS mode.

2. How to Set Up RIS Using Information about Incident Beam Pattern and Hierarchical Structure for RIS Mode.

According to various embodiments of the disclosure, method 1 sequentially probes candidate RIS modes, but method 2 stores per-incident beam candidate RIS modes in a hierarchical structure, gradually secures information about the geographic location of the $MT_{EV}$ from the probing result to gradually reduce the range of candidate RIS modes to be probed, further shortening the probing time. Method 2 may also include the manufacturer's pre-task and RIS setting task.

According to various embodiments of the disclosure, the pre-task by the manufacturer may be as follows.

1) May classify incident beams per incident beam pattern or assign incident beam IDs. 2) May design a structure for candidate RIS modes per incident beam gradually or hierarchically with respect to the reflection direction and/or reflection beam width. The record for the candidate RIS mode designed in the hierarchical structure may be recorded in the beam book 110 and stored in the RC 303. 3) May store the classification scheme for the incident beam (e.g., incident beam ID=f(AoA)) in the RC 303.

According to various embodiments of the disclosure, an example of a hierarchical structure of a candidate RIS mode may be as follows.

1) A RIS mode corresponding to a plurality of wide beams having different reflection directions may be selected and be defined as a root node (e.g., mode 1.0.0, mode 2.0.0, or mode 3.0.0 of FIG. 14). 2) A tree structure for the candidate RIS modes per root node may be designed. (e.g., mode 1.1.0, mode 1.2.0, and mode 1.3.0 which have mode 1.0.0 of FIG. 14 as the root node). 3) As the beam width of the reflection beam reduces from wide to narrow, the correlation to the reflection beam direction increases. In other words, a parent-child relationship may be formed between the candidate RIS modes in the lower layer and the root node.

Figure 13:
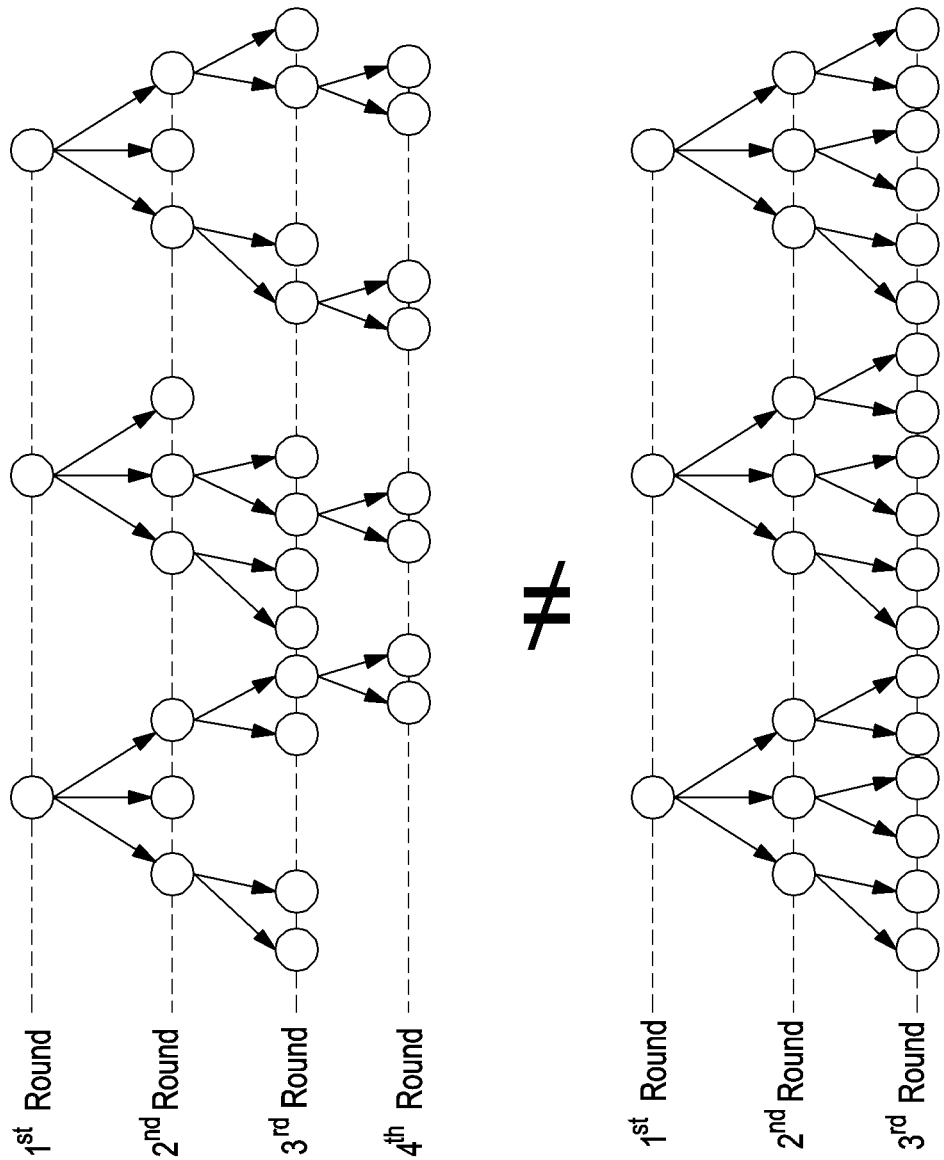
FIG. 13 is a view illustrating a hierarchical structure for a candidate RIS mode per incident beam according to the embodiment of method 2 according to an embodiment of the disclosure.

FIG. 13 is a view illustrating a hierarchical structure for a candidate RIS mode per incident beam of method 2 according to an embodiment of the disclosure.

Figure 14:
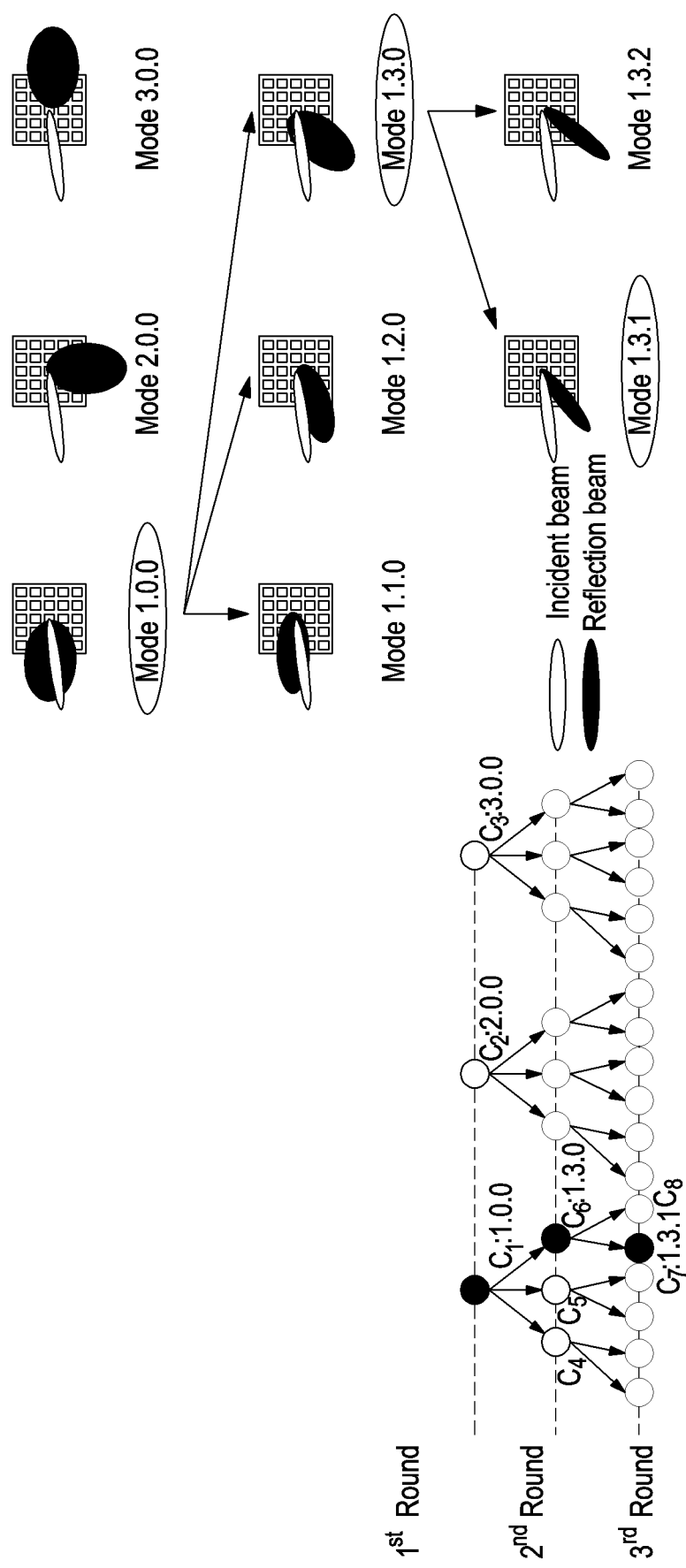
FIG. 14 is a view illustrating an embodiment of deriving an optimal RIS through hierarchical probing of method 2 according to an embodiment of the disclosure.

FIG. 14 is a view illustrating an embodiment of deriving an optimal RIS through hierarchical probing according to an embodiment of the disclosure.

Figure 15:
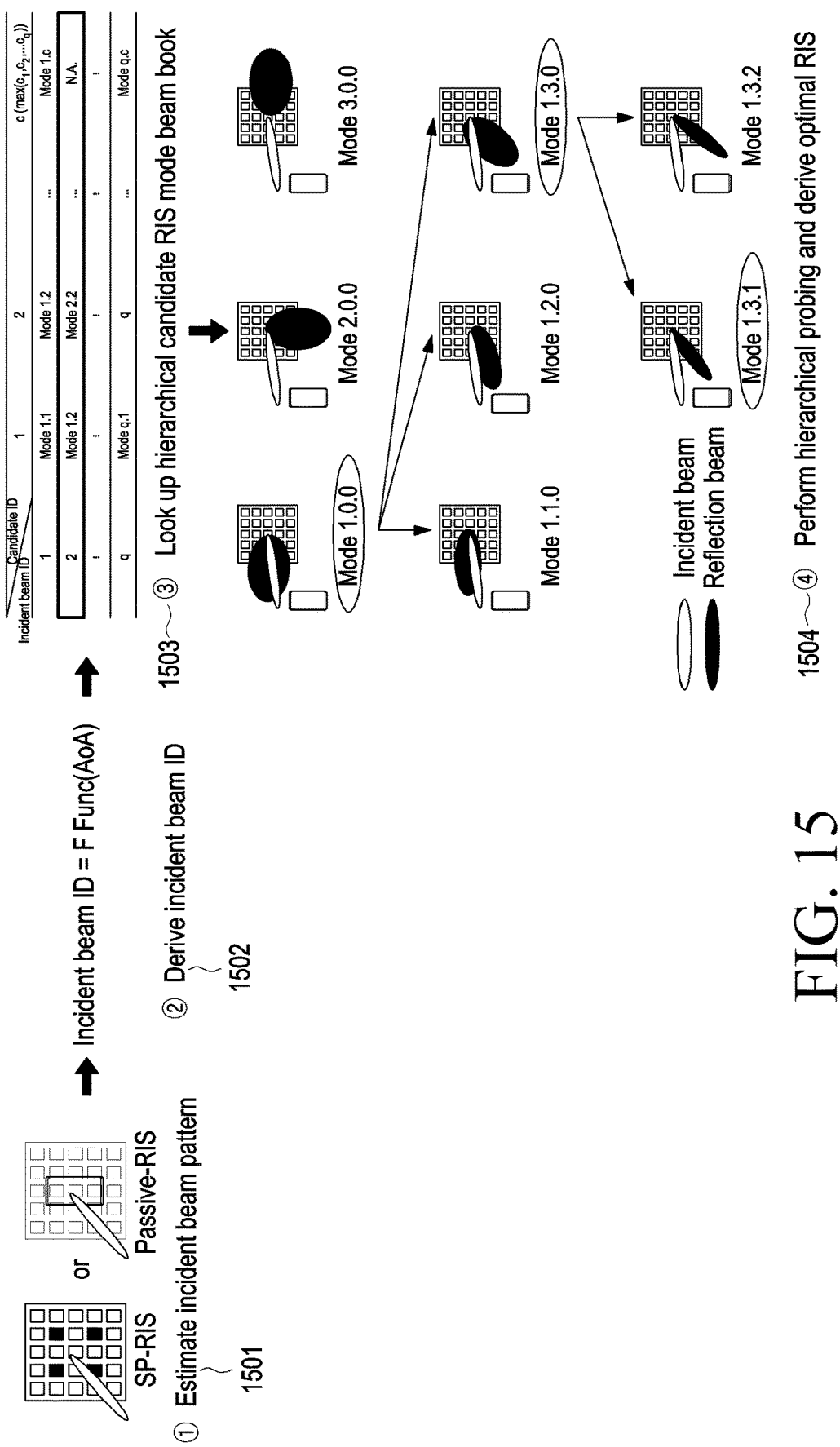
FIG. 15 is a view illustrating a procedure by an MT for the embodiment of method 2 according to an embodiment of the disclosure.

FIG. 15 is a view illustrating a procedure by an MT according to an embodiment of the disclosure.

Referring to FIGS. 13, 14, and 15, they illustrate an embodiment in which a hierarchical structure for candidate RIS modes is applied per incident beam according to an embodiment of the disclosure. In the hierarchical structure designed per incident beam, the number of root nodes and the number of candidate RIS modes in the root node may be changed. For example, the tree structure for candidate RIS modes for incident beam i may differ from the tree structure for candidate RIS modes for incident beam j.

According to another embodiment of the disclosure, a process for setting an RIS as a hierarchical structure for candidate RIS modes may be illustrated. An RIS setting procedure may be as follows. 1) By analyzing the incident beam pattern, the $MT_{EV}$ may obtain the ID for the incident beam, 2) the $MT_{EV}$ may request information about the candidate RIS mode corresponding to the incident beam ID, 3) the $MT_{EV}$ may obtain candidate RIS modes in the hierarchical structure corresponding to the incident beam ID from the RC, 4) the $MT_{EV}$ may perform probing according to the hierarchical structure, and 5) the $MT_{EV}$ may derive the optimal RIS mode using the probing result.

Referring to FIG. 14, the probing according to the hierarchical structure may perform the following procedure.

1) The $MT_{EV}$ may first perform probing on the root RIS mode (e.g., RIS mode classified as a wide beam) corresponding to the root node of the tree (e.g., $1^{st}$ Round of FIG. 14). For example, in the candidate RIS modes classified per wide beam, there may be various beam directions, and probing may first be performed on Mode 1.0.0, Mode 2.0.0 and Mode 3.0.0 which are candidate RIS modes with the largest beam width. 2) The $MT_{EV}$ 301 may store the RIS mode (e.g., Mode 1.0.0) with the best link quality among the results of measurement of the link quality for the first probed root RIS mode and perform probing on child RIS modes corresponding to narrower beams and having similar beam directions to the RIS mode (e.g., $2^{nd}$ Round of FIG. 14). For example, the child RIS modes of Mode 1.0.0 of FIG. 14 may be Mode 1.1.0, Mode 1.2.0, and Mode 1.3.0. 3) The $MT_{EV}$ 301 may store the child RIS mode (e.g., Mode 1.3.0) with the best link quality among the results of measurement of the link quality for the child RIS nodes and perform probing on the child node of the corresponding RIS mode. 4). The $MT_{EV}$ 301 may repeat step 3) until no more RIS mode with narrow beam widths exist among the child nodes while performing probing up to the child node in the root. For example, the $MT_{EV}$ 301 may probe Mode 1.3.1 and Mode 1.3.2 which have similar directions to Mode 1.3.0 and are a narrower child node (e.g., $3^{rd}$ Round of FIG. 14) and, as there is no more RIS mode with a narrow beam, terminate the probing. 5) The $MT_{EV}$ 301 may terminate the probing and select the optimal RIS mode using the stored probing result.

FIG. 15 is a view illustrating a procedure by a $MT_{EV}$ for an embodiment of method 2 according to an embodiment of the disclosure.

Referring to FIG. 15, according to various embodiments of the disclosure, when the RIS 302 is set as the passive RIS mode C1 501, the $MT_{EV}$ 301 may estimate the incident beam pattern incident on the $MT_{EV}$ 301 and, when set as the semi-passive RIS 502, the RIS 302 itself may estimate the incident beam pattern at operation 1501. Based on the information received from the RC 303, the $MT_{EV}$ 301 or semi-passive RIS 502 may derive at operation 1502 the ID for the incident beam using previously given incident beam information (e.g., information regarding the beam characteristics, e.g., incident direction and beam width of the incident beam). The $MT_{EV}$ 301 may look up at operation 1503 the beam book for the candidate RIS modes stored in the hierarchical structure per incident beam, with the previously given candidate RIS mode information. The $MT_{EV}$ 301 may perform the process of hierarchically performing probing on the candidate RIS modes from the higher layer (root) and deriving at operation 1504 the optimal RIS mode.

3. How to Select an RIS Using Incident Beam Pattern Information and Machine Learning (ML).

According to various embodiments of the disclosure, method 1 sequentially probes the candidate RIS modes per incident beam, but method 3 performs probing on the feature RIS mode selected per incident beam by the manufacturer and derives the optimal RIS mode (output value of ML model) using the result as the feature (input value of ML model) trained per incident beam in advance, thereby further shortening the probing time. Method 3 may also include the manufacturer's pre-task and RIS setting task.

According to various embodiments of the disclosure, the pre-task by the manufacturer may be as follows.

1) May classify incident beams per incident beam pattern and assign IDs to the incident beams. 2) May select a plurality of feature RIS modes per incident beam and design an ML model structure per incident beam. 3) May collect training samples to be used for machine learning per incident beam and train the ML model (training). In this case, the model may be represented with features and a label. The features may be the results of measurement of link quality of feature RIS modes, and the label may be the optimal RIS mode. 4) May store parameters for the ML model trained per incident beam in the RC 303. 5) May store an incident beam classification scheme (e.g., incident beam ID=f(AoA)) in the RC 303.

Figure 16A:
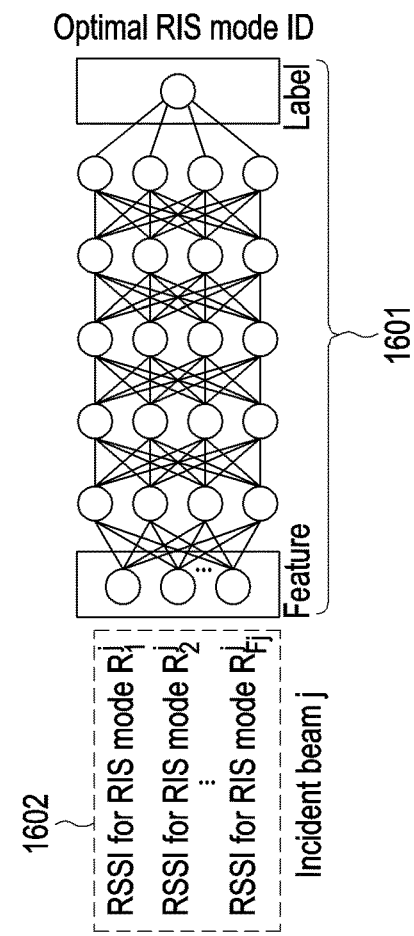
FIG. 16A is a view illustrating feature RIS mode and ML model design per incident beam of method 3 according to an embodiment of the disclosure.
Figure 16A:
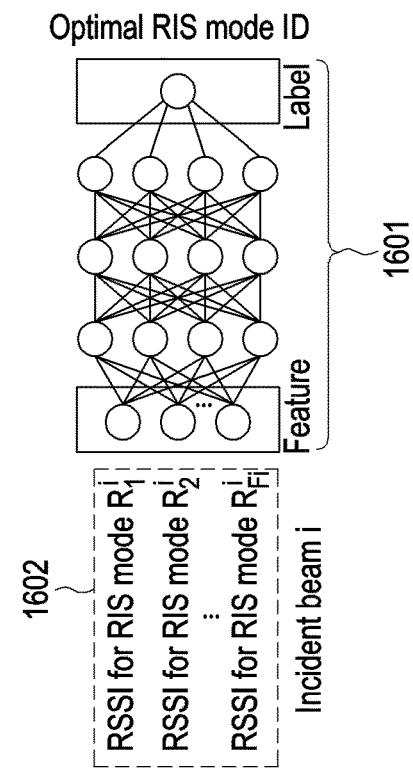

FIG. 16A is a view illustrating feature RIS mode and ML model design per incident beam of method 3 according to an embodiment of the disclosure.

Figure 16B:
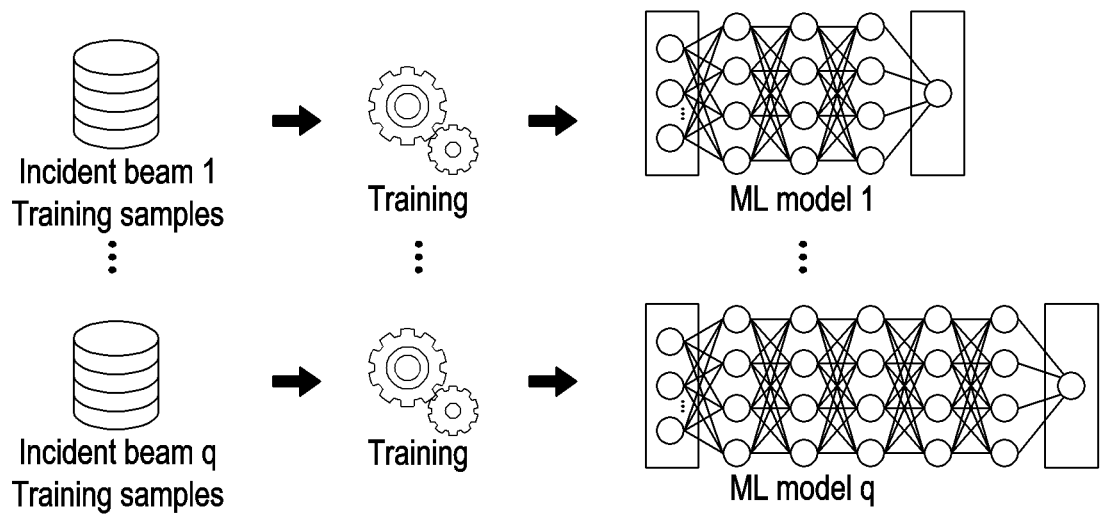
FIG. 16B is a view illustrating ML model training per incident beam of method 3 according to an embodiment of the disclosure.

FIG. 16B is a view illustrating ML model training per incident beam of method 3 according to an embodiment of the disclosure.

FIG. 16A is an embodiment for a feature RIS mode and an ML model per incident beam. An ML model 1601 and a feature RIS mode 1602 specified per incident beam (e.g., incident beam i and incident beam j of FIG. 16A) may be had. The feature RIS mode 1602 per incident beam may be selected considering the reflection beam steering characteristics of the RIS modes when the corresponding incident beam is applied by the manufacturer. For example, the feature RIS mode 1602 for incident beam i may be the input value of the ML model 1601. The RIS modes may be denoted as $R^i_1, R^i_2, \ldots, R^i_{Fi}$, respectively. The feature RIS mode 1602 for incident beam j may be the input value of the ML model 1601, and the RIS modes may be denoted as $R^j_1, R^j_2, \ldots, R^j_{Fj}$, respectively.

According to various embodiments of the disclosure, an embodiment for a process of collecting training samples per incident beam may be as follows. 1) May measure the link quality (e.g., the strength index of received signal, received signal strength indicator (RSSI)) when applying each RIS mode in each position while changing the position of the meter (Rx) (e.g., the $MT_{EV}$ 301 of FIG. 3 or the RX 1702 of FIG. 17). 2) May select the optimal RIS mode in each position of the meter (Rx) and use it as the label (e.g., the result value of the ML model) of the training sample. 3) May store the link quality values corresponding to the feature RIS modes 1602 in the respective positions of the meter (Rx) and use them as the features (input values of the ML model) of the training samples. The number of the finally collected training samples is the same as the number of positions of the meter (Rx) used for measurement. Or, when the position of the meter (Rx) is fixed, the number of finally collected training samples may be equal to the number of incident beams. As an example, when the incident beam of the meter (RX) is i, the ML model may be trained using the RSSI value as an input value for each of $F_i$ RIS modes $R^i_1, R^i_2, \ldots, R^i_{Fi}$. The ML model may be trained so that the optimal RIS mode with the highest link quality value for incident beam i is the label (result value of ML model). Likewise, for incident beam j, the features may be the respective RSSI values of the RIS modes $R^j_1, R^j_2, \ldots, R^j_{Fj}$, and the ML model may be trained using the optimal RIS mode having the optimal RSSI as the label.

FIG. 16B illustrates an ML model according to machine learning (ML) per incident beam. When the incident beam is the training sample, the ML model may be trained on each of incident beam 1 to incident beam q. After training the ML model to derive the optimal RIS mode for incident beam 1, ML model 1 may be derived. Similarly, ML model q which is trained to derive the optimal RIS mode for incident beam q may be derived. The number of ML model 1 to ML model q may be equal to the number of incident beams. Further, each of ML model 1 to ML model q may differ in characteristics, e.g., the number of layers or the number of nodes inside each model.

Figure 17:
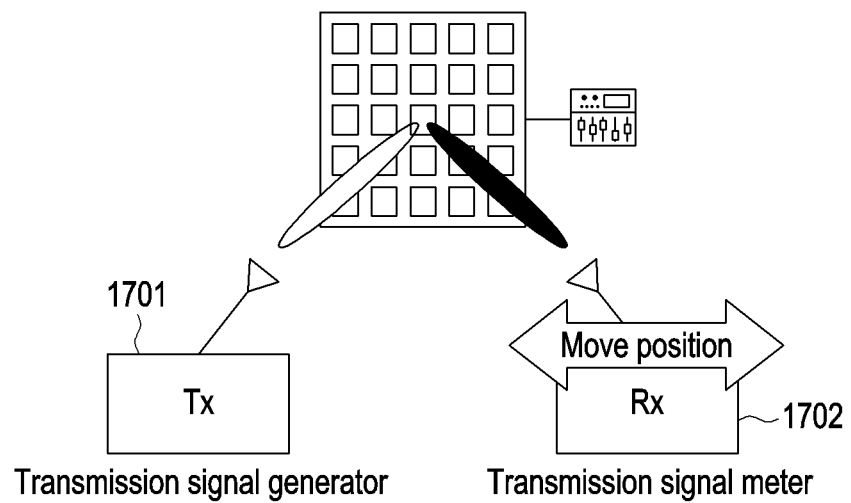
FIG. 17 is a view illustrating ML model training per RX position of method 3 according to an embodiment of the disclosure.

FIG. 17 is a view illustrating a ML model training per RX position of method 3 according to an embodiment of the disclosure.

FIG. 17 is an embodiment of training an ML model 1601 using the training samples collected for each position of the meter 1702. A transmission signal generator 1701 and a reception signal meter 1702 may dispose antennas toward the RIS 302 and train and derive an ML model for each position while moving the position of the meter 1702. The ML model may be trained for each of all the incident beams while changing the position of the signal generator 1701 or the RIS 302. The ML models per position of the meter 1702 may be trained independently from each other, or ML model training may be sequentially performed while the training result of the trained ML model is used for training the next ML model (transfer learning).

Figure 18:
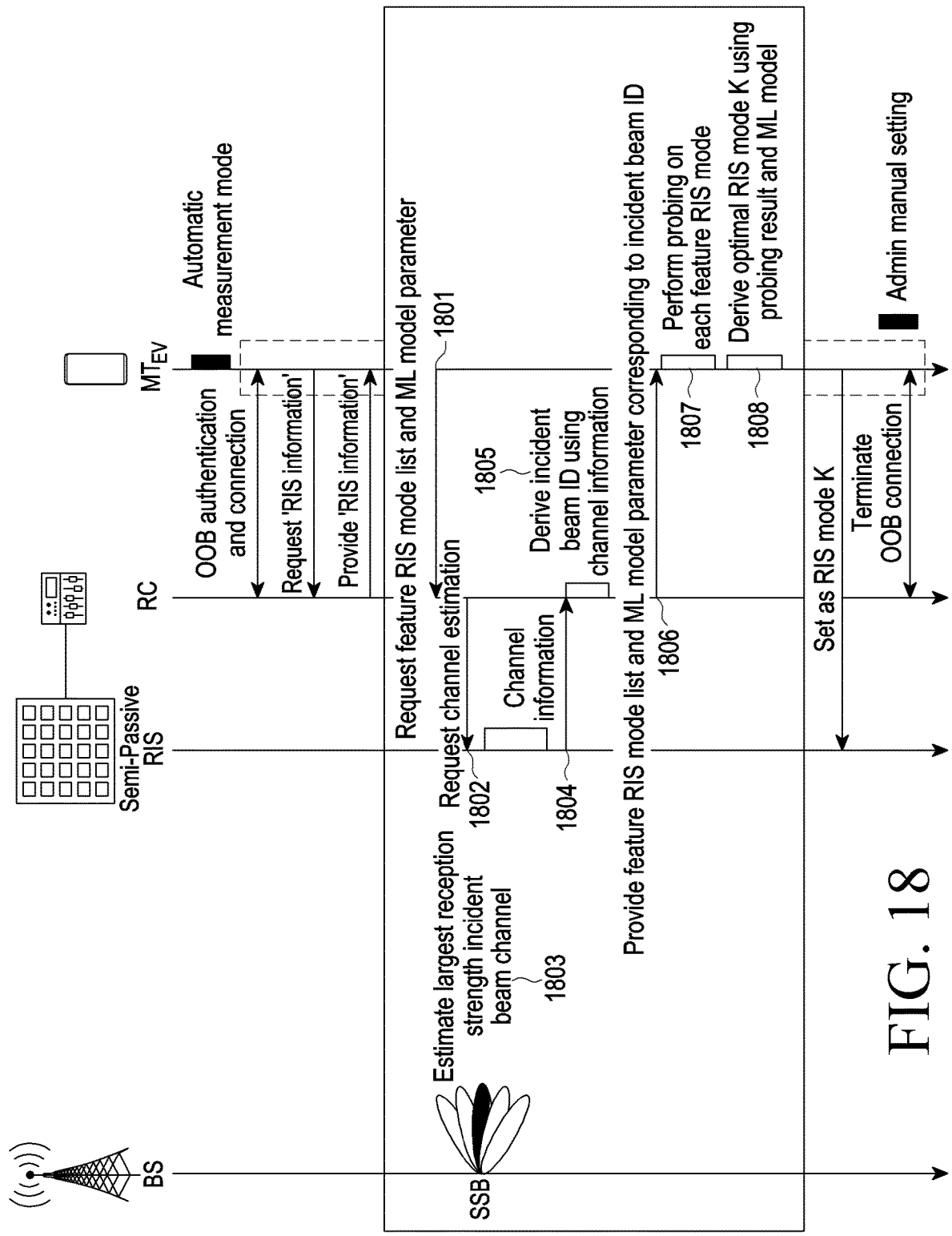
FIG. 18 is a view illustrating an operation for semi-passive RIS of method 3 according to an embodiment of the disclosure.

FIG. 18 is a view illustrating an operation for semi-passive RIS of method 3 according to an embodiment of the disclosure.

Figure 19:
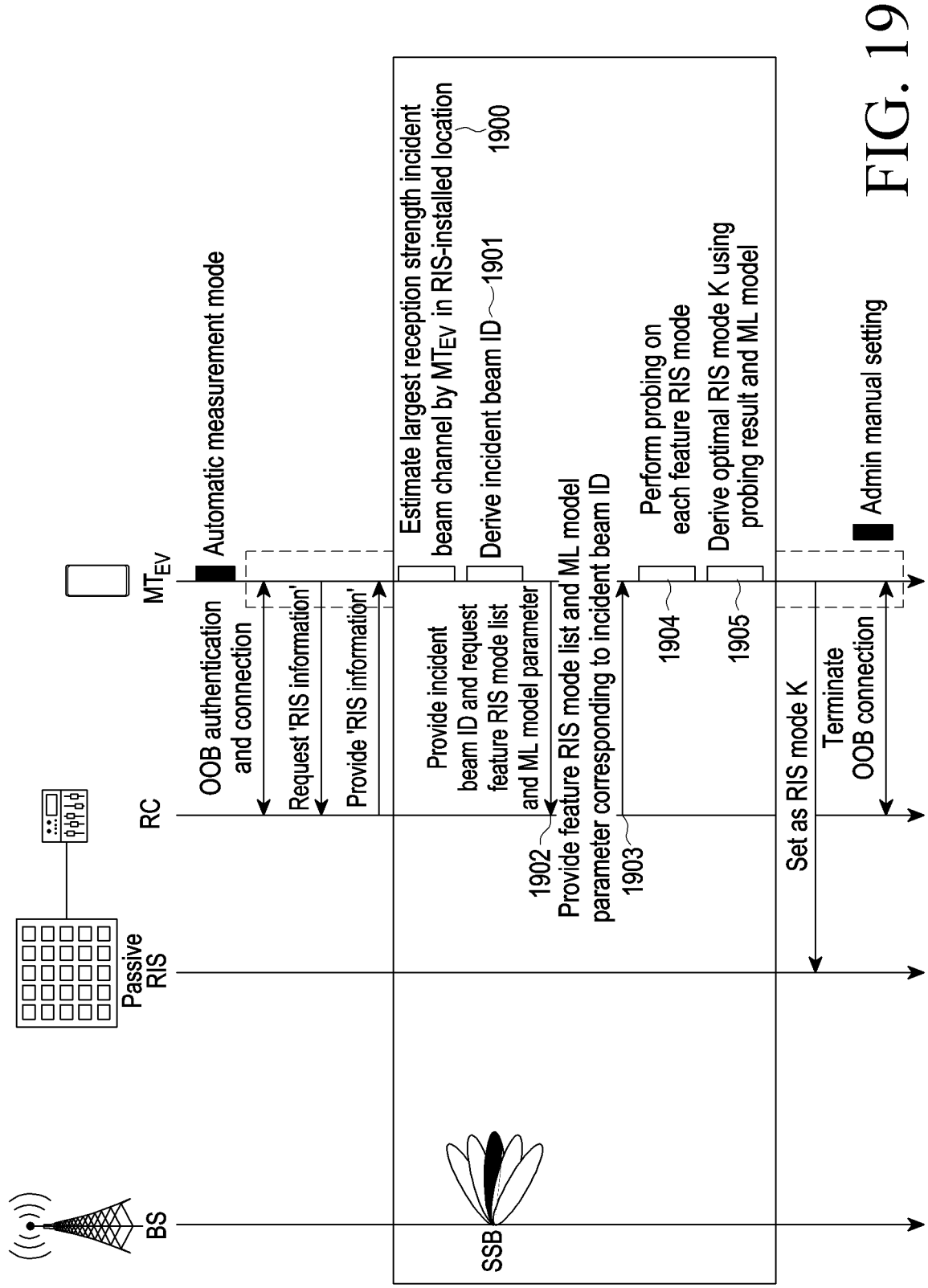
FIG. 19 is a view illustrating an operation for passive RIS of method 3 according to an embodiment of the disclosure.

FIG. 19 is a view illustrating an operation for passive RIS of method 3 according to an embodiment of the disclosure.

According to various embodiments of the disclosure, the RIS setting task using ML may be as follows. 1) The $MT_{EV}$ 301 or RIS 302 may analyze the incident beam pattern to obtain the incident beam ID, 2) the $MT_{EV}$ 301 may obtain information about the feature RIS mode and the ML model parameter corresponding to the incident beam ID from the RC, 3) the $MT_{EV}$ 301 may perform probing on the feature RIS mode, and 4) the $MT_{EV}$ 301 may input the probing result to the ML model to derive the optimal RIS mode.

FIGS. 18 and 19 illustrate embodiments of the disclosure for the case where the RIS 302 is set as the semi-passive RIS and the case where the RIS 302 is set as the passive RIS. The essential difference between the two examples lies in that incident beam pattern analysis is performed by the RIS 302 itself or by $MT_{EV}$ 301. The description made in connection with FIG. 8 may be applied to the RIS setting process.

Referring to FIG. 18, according to an embodiment of the disclosure, the $MT_{EV}$ 301 may receive the RIS information obtained from the RC 303. When the RIS setting is the semi-passive RIS 502, the $MT_{EV}$ 301 may request at operation 1801 information about the feature RIS mode and ML model parameter corresponding to the incident beam ID from the RC 303, and the RC 303 may request at operation 1802 the semi-passive RIS 502 for channel estimation. The semi-passive RIS 502 receiving the SSB signal 504 through the transmission beam from the BS 300 may estimate the channel of the incident beam having the largest reception strength at operation 1803. The semi-passive RIS 502 may transmit the estimated channel information to the RC 303 at operation 1804, and the RC 303 may derive at operation 1805 the ID of the incident beam using the received channel information. The RC 303 may provide at operation 1506 information (e.g., feature RIS mode list) about the feature RIS mode and ML model parameter corresponding to the incident beam ID, the $MT_{EV}$ 301 may perform at operation 1507 probing on each feature RIS mode from the RC, and the $MT_{EV}$ 301 may derive the optimal RIS mode using the probing result and ML model at operation 1508. To set as the optimal RIS mode (e.g., RIS Mode K), the $MT_{EV}$ 301 may transfer the derived optimal mode to the RC 303 and terminate the OOB connection with the RC 303.

Referring to FIG. 19, when the RIS 302 is set as the passive RIS mode C1 501, the $MT_{EV}$ 301 may receive RIS information, and the $MT_{EV}$ 301 may estimate the channel for the incident beam with the largest reception strength among the incident beams incident on the $MT_{EV}$ 301 in the RIS-installed location at operation 1900. The $MT_{EV}$ 301 may derive the ID for the incident beam based on previously given incident beam information (e.g., information regarding the beam characteristics, such as incident direction or beam width of the incident beam) at operation 1901, provide the ID for the incident beam to the RC 303, and request information about the feature RIS mode and ML model parameter corresponding to the incident beam ID at operation 1902. The RC 303 provides at operation 1903 the information (e.g., feature RIS mode list) about the feature RIS mode and ML model parameter corresponding to the incident beam ID, and the $MT_{EV}$ 301 receiving the same performs at operation 1904 probing on each feature RIS mode. The $MT_{EV}$ 301 may derive the optimal RIS mode using the probing result and ML model at operation 1905.

4. How to Set Up RIS Simultaneously Using Information about Incident Beam Pattern and Location Information about the Shadow Area.

According to various embodiments of the disclosure, method 1 sequentially probes candidate RIS modes per incident beam, but method 4 derives the optimal RIS mode without a probing procedure by simultaneously using the location information about the shadow area and incident beam information by the manufacturer to thereby minimize the RIS setting time. Method 4 may also include the manufacturer's pre-task and RIS setting task.

According to various embodiments of the disclosure, the pre-task by the manufacturer may be as follows.

1) May classify incident beams per incident beam pattern and assign IDs to the incident beams. 2) May classify reflectable candidate shadow areas (direction and/or distance may be considered). The classified candidate shadow areas may be assigned IDs. 3) May derive the optimal RIS mode per incident beam ID for each candidate shadow area, record it in the beam book, and store the beam book in the RC 303. 4) May store the classification scheme (e.g., incident beam ID=f(AoA)) for incident beam IDs and candidate shadow area IDs in the RC 303.

Figure 20:
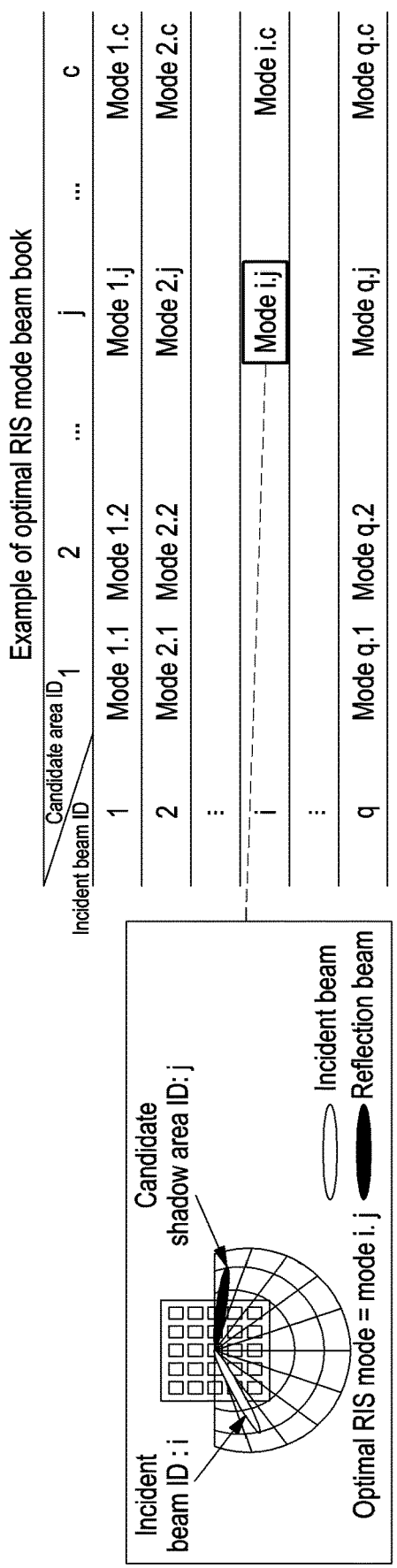
FIG. 20 is a view illustrating a beam book of method 4 according to an embodiment of the disclosure.

FIG. 20 is a view illustrating a beam book of method 4 according to an embodiment of the disclosure.

FIG. 20 illustrates a beam book simultaneously considering the incident beam and the location of the shadow area. The manufacturer may derive and store, in the beam book, the optimal RIS mode for each combination {incident beam ID, candidate shadow area ID}. For example, when the incident beam ID is i, and the candidate shadow area ID is j, the optimal RIS mode may be expressed and stored as Mode i.j.

According to various embodiments of the disclosure, the RIS setting task may be as follows.

1) The $MT_{EV}$ or RIS may classify incident beams per incident beam pattern and assign IDs to the incident beams. 2) The $MT_{EV}$ may capture the RIS or the quick response (QR) code attached to the RIS by way of a camera. 3) The $MT_{EV}$ may analyze the RIS or captured QR code image to derive the angle and/or distance from the RIS as the location of the $MT_{EV}$ located in the shadow area. 4) The RIS modes may be looked up in the beam book simultaneously using the incident beam information and location information about the $MT_{EV}$ located in the shadow area, setting the optimal RIS mode.

Figure 21:
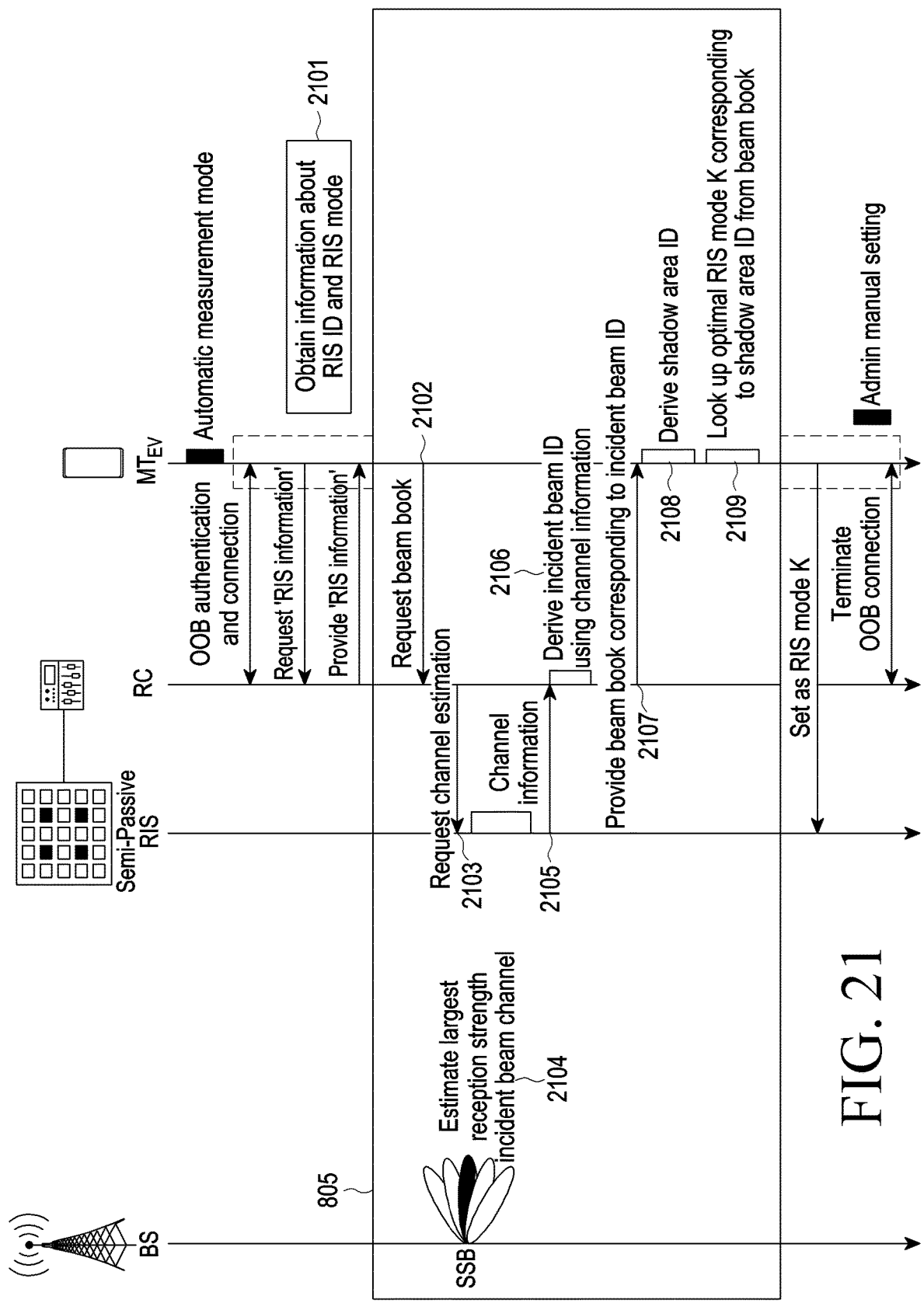
FIG. 21 is a view illustrating an operation for semi-passive RIS of method 4 according to an embodiment of the disclosure.

FIG. 21 is a view illustrating an operation for semi-passive RIS of method 4 according to an embodiment of the disclosure.

Figure 22:
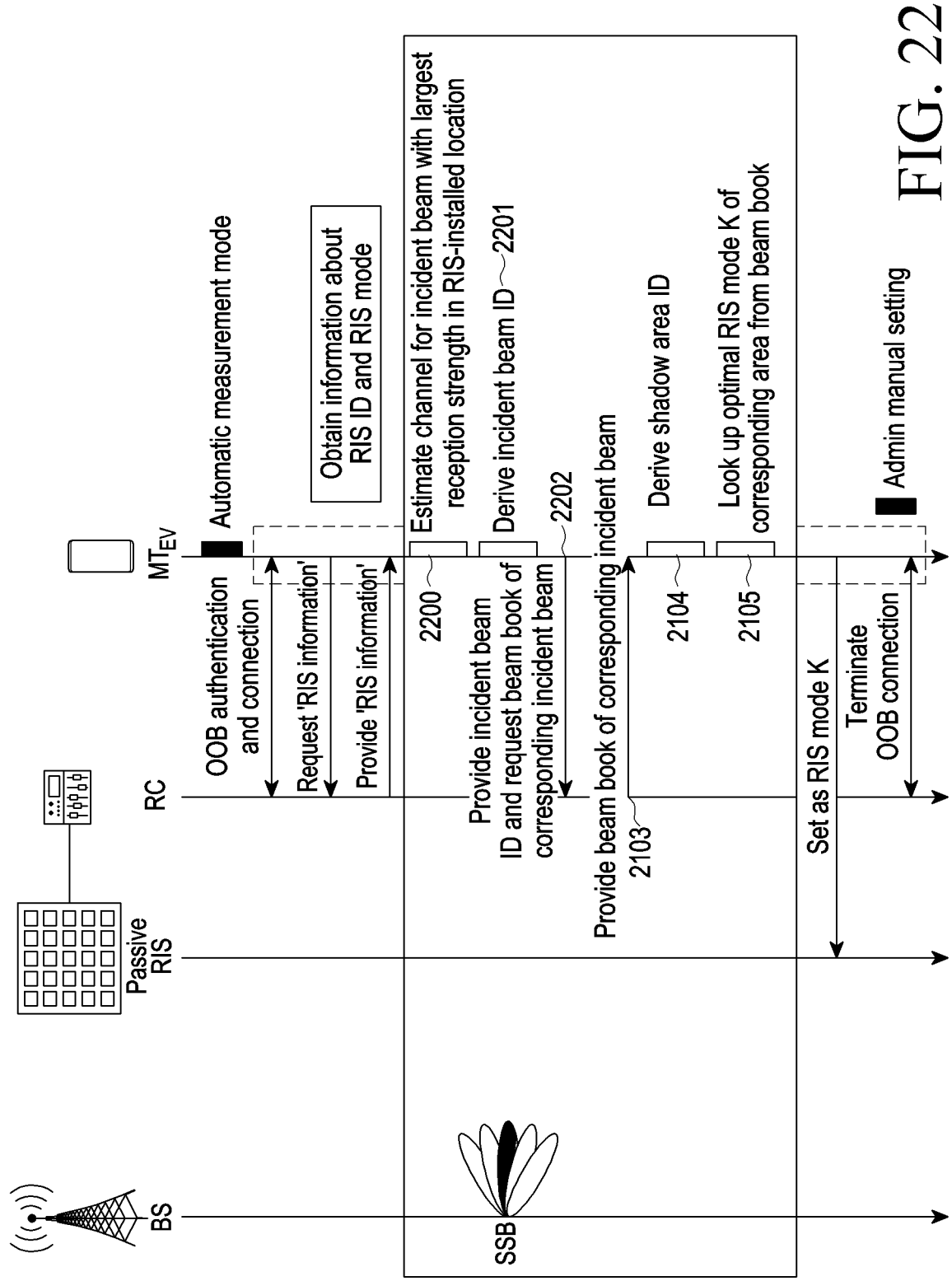
FIG. 22 is a view illustrating an operation for passive RIS of method 4 according to an embodiment of the disclosure.

FIG. 22 is a view illustrating an operation for passive RIS of method 4 according to an embodiment of the disclosure.

Figure 23:
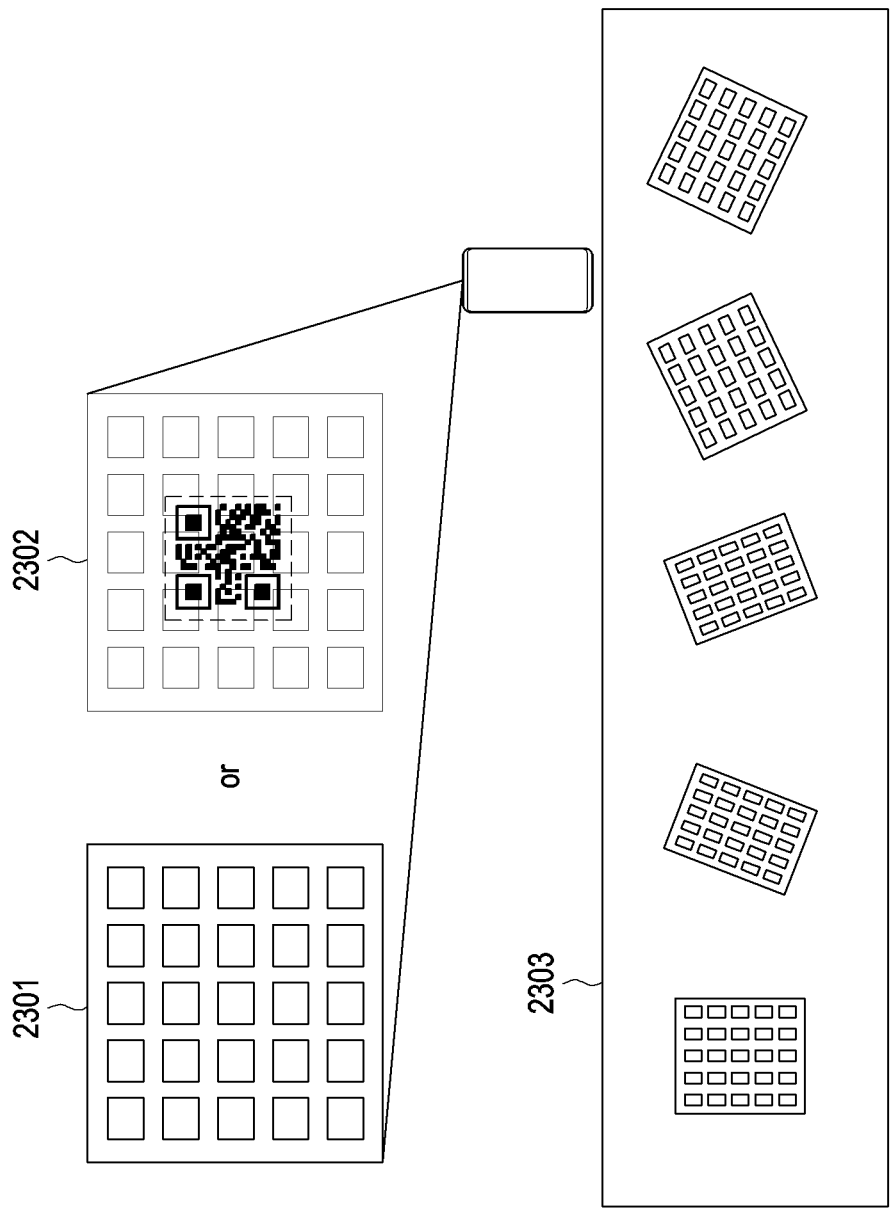
FIG. 23 is a view illustrating a method for deriving a shadow area (identifier) ID of method 4 according to an embodiment of the disclosure.

FIG. 23 is a view illustrating a method for deriving a shadow area ID of method 4 according to an embodiment of the disclosure.

Referring to FIG. 21, according to various embodiments of the disclosure, the $MT_{EV}$ 301 may receive the RIS information obtained from the RC 303. When the RIS setting is the semi-passive RIS 502, the $MT_{EV}$ 301 may obtain at operation 2101 incident beam ID and RIS mode information from the RC 303, and the RC 303 may request at operation 2102 the beam book from the semi-passive RIS 502. The RC 303 may request at operation 2103 the semi-passive RIS 502 for channel estimation. The semi-passive RIS 502 receiving the SSB signal 504 through the transmission beam from the BS 300 may estimate the channel of the incident beam having the largest reception strength at operation 2104. The semi-passive RIS 502 may transmit the estimated channel information to the RC 303 at operation 2105, and the RC 303 may derive at operation 2106 the ID of the incident beam using the received channel information. The RC 303 may provide at operation 2107 the beam book corresponding to the incident beam ID to the $MT_{EV}$ 301. The $MT_{EV}$ 301 may derive at operation 2108 the ID of the shadow area and look up at operation 2109 the optimal RIS mode corresponding to the shadow area ID from the received beam book. The $MT_{EV}$ 301 may transfer the derived optimal mode to the RC 303 and terminate the OOB connection with the RC 303.

Referring to FIG. 22, when the RIS 302 is set as the passive RIS mode C1 501, the $MT_{EV}$ 301 may receive RIS information and, when obtaining the incident beam ID and RIS mode information from the RC 303, the $MT_{EV}$ 301 may estimate the channel for the incident beam with the largest reception strength among the incident beams incident on the $MT_{EV}$ 301 in the RIS-installed location at operation 2200. The $MT_{EV}$ 301 may derive the ID for the incident beam based on previously given incident beam information (e.g., information regarding the beam characteristics, such as incident direction or beam width of the incident beam) at operation 2201, provide the ID for the incident beam to the RC 303, and request the beam book for the corresponding incident beam ID at operation 2202. The RC 303 may provide at operation 2203 the beam book for the corresponding incident beam. The $MT_{EV}$ 301 may derive at operation 2204 the ID for the shadow area and look up the optimal RIS mode for the corresponding area from the beam book at operation 2205.

Referring to FIG. 23, as an example of a method for deriving the ID of the shadow area, the Admin 304 in the shadow area may capture operation 2301 the RIS with the camera of the $MT_{EV}$ 301 or capture the image 2302, e.g., QR code, attached to the RIS and analyze the corresponding image 2303 to calculate a relative position (angle or distance) between the $MT_{EV}$ 301 and the RIS. It is possible to identify the shadow area using information about the relative position and derive the ID for each shadow area.

According to various embodiments of the disclosure, it is possible to enhance the quality of the existing commercial wireless communication service merely by introducing RIS without changing the standards of the related art for base stations and UEs and hardware/software (HW/SW) implementations. As the RIS setting may be automated, even general users may easily perform the optimal RIS setting. This may contribute to common use of RIS products. The RIS setting time may be shortened by the level acceptable for delay in setting a common home appliance by efficiently performing RIS probing necessary for the optimal RIS setting. Thus, it is possible to enhance user quality of experience (QoE).

Figure 24:
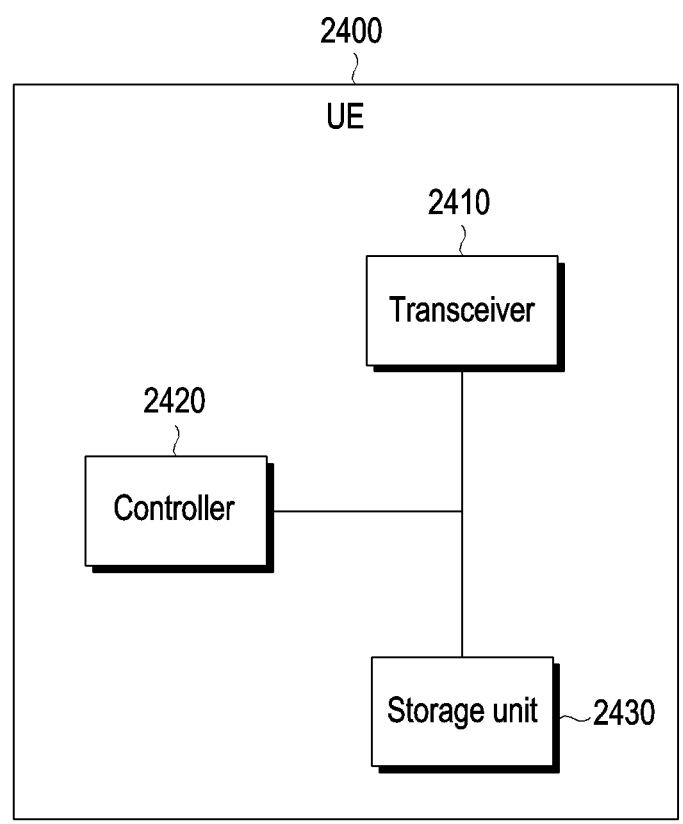
FIG. 24 is a view schematically illustrating an internal structure of a UE according to an embodiment of the disclosure.

FIG. 24 is a view schematically illustrating an internal structure of a UE according to an embodiment of the disclosure.

Referring to FIG. 24, a UE 2400 may include a transceiver 2410, a controller 2420, and a storage unit 2430. The controller 2420 may be defined as a circuit or application-specific integrated circuit or at least one processor.

The transceiver 2410 may transmit and receive signals to/from other network entities. For example, the transceiver 2410 may receive a sync signal through a beam(s) reflected from the RIS or transmit a measurement report for the sync signal to the base station.

The controller 2420 may control the overall operation of the UE 2400 according to embodiments proposed in the disclosure. For example, the controller 2420 may control the signal flow between blocks to perform the operations according to the procedures described above in connection with FIGS. 6 to 8, 9A to 9C, 10 to 15, 16A, and 16B. For example, the controller 2420 may control operations as proposed in the disclosure, such as measuring a plurality of sync signals received from the base station according to the above-described embodiments.

The storage unit 2430 may store at least one of information transmitted/received via the transceiver 2410 and information generated via the controller 2420. For example, the storage unit 2430 may store, e.g., information about timings according to the above-described embodiment.

Figure 25:
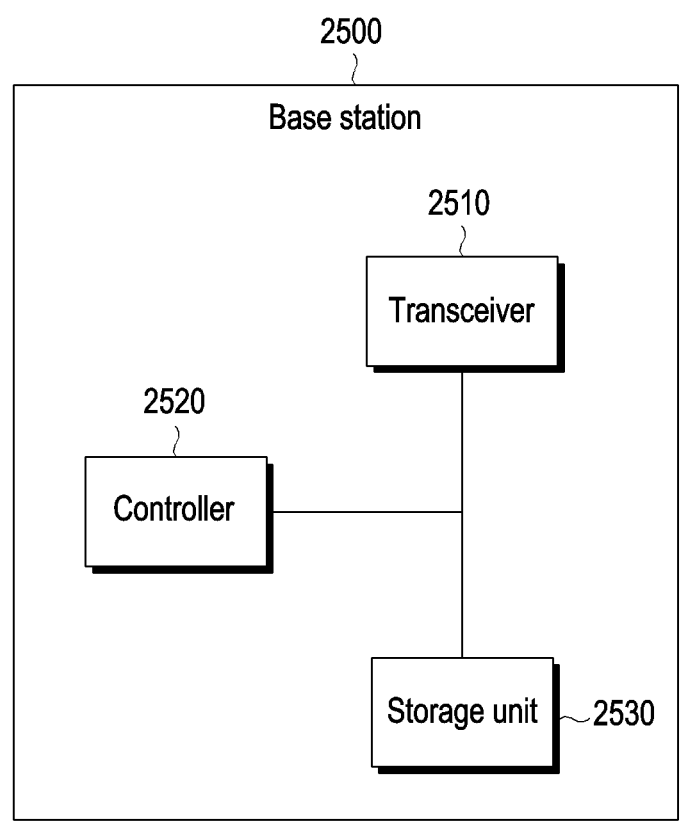
FIG. 25 is a view schematically illustrating an internal structure of a base station according to an embodiment of the disclosure.

FIG. 25 is a view schematically illustrating an internal structure of a base station according to an embodiment of the disclosure.

Referring to FIG. 25, a base station 2500 may include a transceiver 2510, a controller 2520, and a storage unit 2530. The controller 2520 may be defined as a circuit or application-specific integrated circuit or at least one processor.

The transceiver 2510 may transmit and receive signals to/from other network entities. For example, the transceiver 2510 may transmit a control signal to the RC or transmit a sync signal to the UE.

The controller 2520 may control the overall operation of the base station 2500 according to embodiments proposed in the disclosure. For example, the controller 1820 may control the signal flow between blocks to perform the operations according to the procedures described above in connection with FIGS. 6 to 8, 9A to 9C, 10 to 15, 16A, and 16B. For example, the controller 2520 may control operations as proposed in the disclosure, such as determining the optimal beam of the base station 2500 and the optimal reflection pattern of the RIS for the target shadow area according to the above-described embodiments.

The storage unit 2530 may store at least one of information transmitted/received via the transceiver 2510 and information generated via the controller 2520. For example, the storage unit 2530 may store, e.g., information about timings according to the above-described embodiment.

Figure 26:
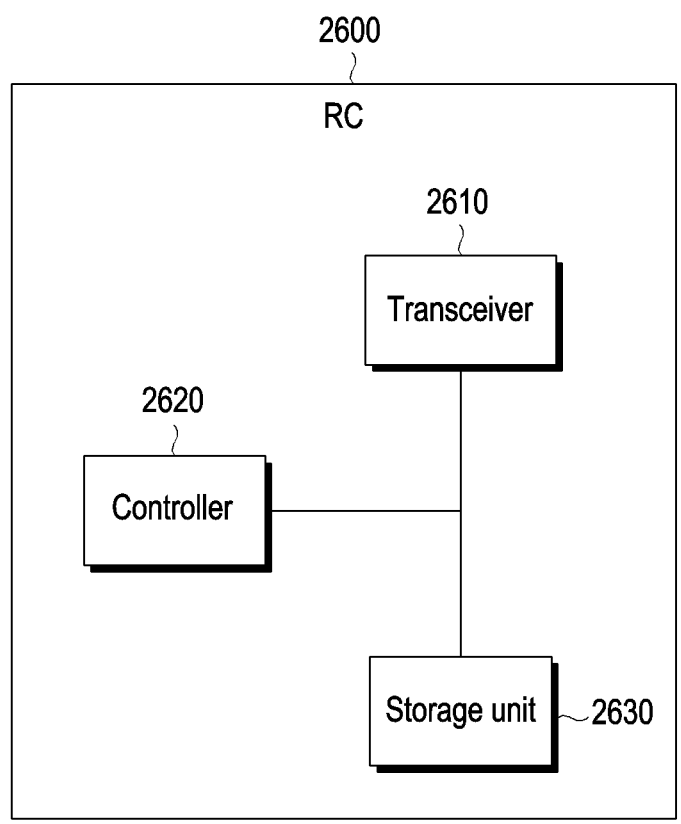
FIG. 26 is a view schematically illustrating an internal structure of an RC according to an embodiment of the disclosure.

FIG. 26 is a view schematically illustrating an internal structure of an RC according to an embodiment of the disclosure.

Referring to FIG. 26, an RC 2600 may include a transceiver 2610, a controller 2620, and a storage unit 2630. The controller 2620 may be defined as a circuit or application-specific integrated circuit or at least one processor.

The transceiver 2610 may transmit and receive signals to/from other network entities. For example, the transceiver 2610 may receive a control signal from the base station.

The controller 2620 may control the overall operation of the RC 2600 according to embodiments proposed in the disclosure. For example, the controller 2620 may control the signal flow between blocks to perform the operations according to the procedures described above in connection with FIGS. 6 to 8, 9A to 9C, 10 to 15, 16A, and 16B. For example, the controller 2620 may control operations as proposed in the disclosure, such as controlling the RIS based on the control signal according to the above-described embodiments.

The storage unit 2630 may store at least one of information transmitted/received via the transceiver 2610 and information generated via the controller 2620. For example, the storage unit 2630 may store, e.g., control signals according to the above-described embodiment.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a user equipment (UE) in a wireless communication system, the method comprising:
  receiving reconfigurable intelligent surface (RIS) information from an RIS controller (RC);
  identifying an incident beam incident on the UE;
  providing information about the identified incident beam to the RC and requesting information about candidate RIS modes;
  receiving the information about the candidate RIS modes;
  performing probing on the candidate RIS modes;
  deriving a final RIS mode among the candidate RIS modes using a result of the probing; and
  transmitting information about the final RIS mode to an RIS through the RC.

2. The method of claim 1,
wherein the RIS information is information including an identifier (ID) of the RIS, and
wherein the information about the candidate RIS modes includes a list of candidate RIS modes classified per incident beam.

3. The method of claim 1, further comprising:
performing probing from a candidate RIS mode having a largest beam width of reflection beam among the candidate RIS modes;
selecting a candidate RIS mode having a largest reception signal strength among first probed candidate RIS modes; and
performing probing on a candidate RIS mode similar in direction of reflection beam to the selected candidate RIS mode and narrower in beam width of reflection beam than the selected candidate RIS mode.

4. The method of claim 3, wherein the candidate RIS modes are arranged in a tree-shaped hierarchical structure based on beam width and beam direction and are probed in order from a higher layer.

5. The method of claim 1,
wherein the RIS information includes information about a machine learning (ML) model using an RIS mode with a largest reception signal strength among the candidate RIS modes as a result value, and
wherein the final RIS mode is derived as a result value obtained by inputting a candidate RIS mode corresponding to an incident beam identified by the UE to the ML model.

6. The method of claim 5, wherein the ML model used to derive the final RIS mode is trained per incident beam pattern.

7. The method of claim 6, further comprising:
capturing the RIS;
estimating a relative position between the UE and the RIS based on the captured RIS;
recognizing the estimated position as a shadow area of the UE; and
deriving a candidate RIS mode corresponding to the shadow area among the candidate RIS modes, as the final RIS mode.

8. The method of claim 7, wherein the final RIS mode is derived based on the relative position between the UE and the RIS, and the incident beam pattern.

9. A method by a reconfigurable intelligent surface (RIS) in a wireless communication system, the method comprising:
receiving a request for channel estimation from an RIS controller (RC);
identifying incident beams incident from a base station to the RIS;
transmitting channel information about an incident beam having a largest reception strength among the incident beams to the RC;
receiving information about an optimal RIS mode derived by a user equipment (UE) through the RC; and
setting the RIS as the optimal RIS mode.

10. The method of claim 9,
wherein the RIS is a device reflecting a signal transmitted from a base station or a UE to be received by the UE or the base station,
wherein the RIS determines an amplitude and phase of a signal reflected in at least one or more RIS unit cells,
wherein the final RIS mode is a combination of respective states of the at least one or more RIS unit cells,
wherein the final RIS mode is pre-configured by a manufacturer, and
wherein information about the final RIS mode is stored in the RC.

11. A user equipment (UE) in a wireless communication system, the UE comprising:
a transceiver; and
at least one processor configured to:
receive reconfigurable intelligent surface (RIS) information from an RIS controller (RC) through the transceiver,
identify an incident beam incident on the UE,
provide information about the identified incident beam to the RC through the transceiver and request information about candidate RIS modes,
receive the information about the candidate RIS modes through the transceiver,
perform probing on the candidate RIS modes,
derive a final RIS mode among the candidate RIS modes using a result of the probing, and
transmit, through the transceiver, information about the final RIS mode to an RIS through the RC.

12. The UE of claim 11,
wherein the RIS information is information including an identifier (ID) of the RIS, and
wherein the information about the candidate RIS modes includes a list of candidate RIS modes classified per incident beam.

13. The UE of claim 11, wherein the at least one processor is further configured to:
perform probing from a candidate RIS mode having a largest beam width of reflection beam among the candidate RIS modes,
select a candidate RIS mode having a largest reception signal strength among first probed candidate RIS modes, and
performing probing on a candidate RIS mode similar in direction of reflection beam to the selected candidate RIS mode and narrower in beam width of reflection beam than the selected candidate RIS mode.

14. The UE of claim 13, wherein the candidate RIS modes are arranged in a tree-shaped hierarchical structure based on beam width and beam direction and are probed in order from a higher layer.

15. The UE of claim 11,
wherein the RIS information includes information about an ML model using an RIS mode with a largest reception signal strength among the candidate RIS modes as a result value, and
wherein the final RIS mode is derived as a result value obtained by inputting a candidate RIS mode corresponding to an incident beam identified by the UE to the ML model.

16. The UE of claim 15, wherein the ML model used to derive the final RIS mode is trained per incident beam pattern.

17. The UE of claim 16, wherein the at least one processor is further configured to:
capture the RIS,
estimate a relative position between the UE and the RIS based on the captured RIS,
recognize the estimated position as a shadow area of the UE, and
derive a candidate RIS mode corresponding to the shadow area among the candidate RIS modes, as the final RIS mode.

18. The UE of claim 17, wherein the at least one processor is further configured to derive the final RIS mode based on the relative position between the UE and the RIS and the incident beam pattern.

19. A reconfigurable intelligent surface (RIS) in a wireless communication system, the RIS comprising:
- a transceiver; and
- at least one processor configured to:
  - receive a request for channel estimation from an RIS controller (RC) through the transceiver,
  - identify incident beams incident from a base station to the RIS,
  - transmit, through the transceiver, channel information about an incident beam having a largest reception strength among the incident beams to the RC,
  - receive, through the transceiver, information about a final RIS mode derived by a user equipment (UE) through the RC, and
  - set the RIS as the final RIS mode.

20. The RIS of claim 19,
- wherein the RIS is a device reflecting a signal transmitted from a base station or a UE to be received by the UE or the base station,
- wherein the RIS determines an amplitude and phase of a signal reflected in at least one or more RIS unit cells,
- wherein the final RIS mode is a combination of respective states of the at least one or more RIS unit cells,
- wherein the final RIS mode is set by a manufacturer in advance, and
- wherein information about the final RIS mode is stored in the RC.

* * * * *